(12) United States Patent
Nakamura et al.

(10) Patent No.: US 6,674,786 B1
(45) Date of Patent: Jan. 6, 2004

(54) DATA DEMODULATION

(75) Inventors: Hiroshi Nakamura, Nagano (JP); Mitsuo Yokozawa, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/551,960

(22) Filed: Apr. 19, 2000

(30) Foreign Application Priority Data

Apr. 23, 1999 (JP) ............................................ 11-116202
Nov. 2, 1999 (JP) ............................................ 11-311884

(51) Int. Cl.[7] .............................. H03D 1/00; H04L 27/06
(52) U.S. Cl. ......................................... 375/34; 386/104
(58) Field of Search ................................. 375/340, 342, 375/324; 369/59.1, 59.1 B, 13.37; 386/96, 99, 104

(56) References Cited

U.S. PATENT DOCUMENTS

| 4,551,846 A | 11/1985 | Takeda et al. ............... 375/328 |
| 5,285,328 A | 2/1994 | Behr et al. ..................... 360/53 |
| 5,379,037 A | 1/1995 | Harrison et al. ............... 341/71 |
| 5,960,152 A * | 9/1999 | Sawabe et al. ................ 386/98 |
| 6,570,722 B2 * | 5/2003 | Yokozawa et al. ............. 360/2 |
| 6,597,861 B1 * | 7/2003 | Tozaki et al. ................ 386/104 |

FOREIGN PATENT DOCUMENTS

| EP | 1 041 556 | 10/2000 |
| JP | 9023248 | 1/1997 |

OTHER PUBLICATIONS

*English Abstract of JP 9023248.
International Standard ISO/IEC 7811–2, Identification Cards—Recording Technique—Part 2 Magnetic Stripe.

* cited by examiner

Primary Examiner—Mohammad H. Ghayour
(74) Attorney, Agent, or Firm—Reed Smith LLP

(57) ABSTRACT

The accuracy of demodulation of data from a magnetic stripe is enhanced by comparing time intervals between successive peaks of each character of the signal read from the stripe against a set of predetermined reference successive peak time intervals for the data characters.

11 Claims, 16 Drawing Sheets

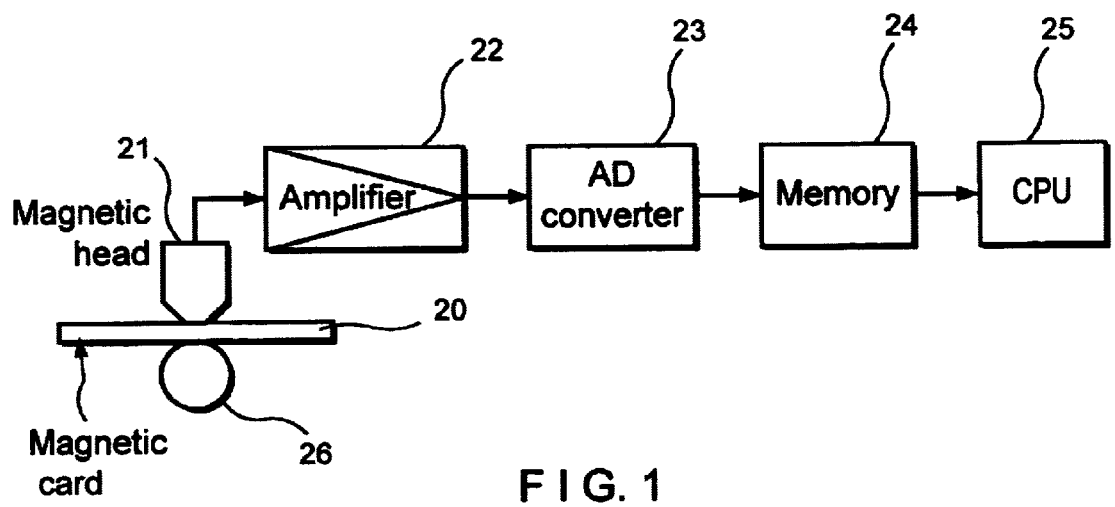
F I G. 1
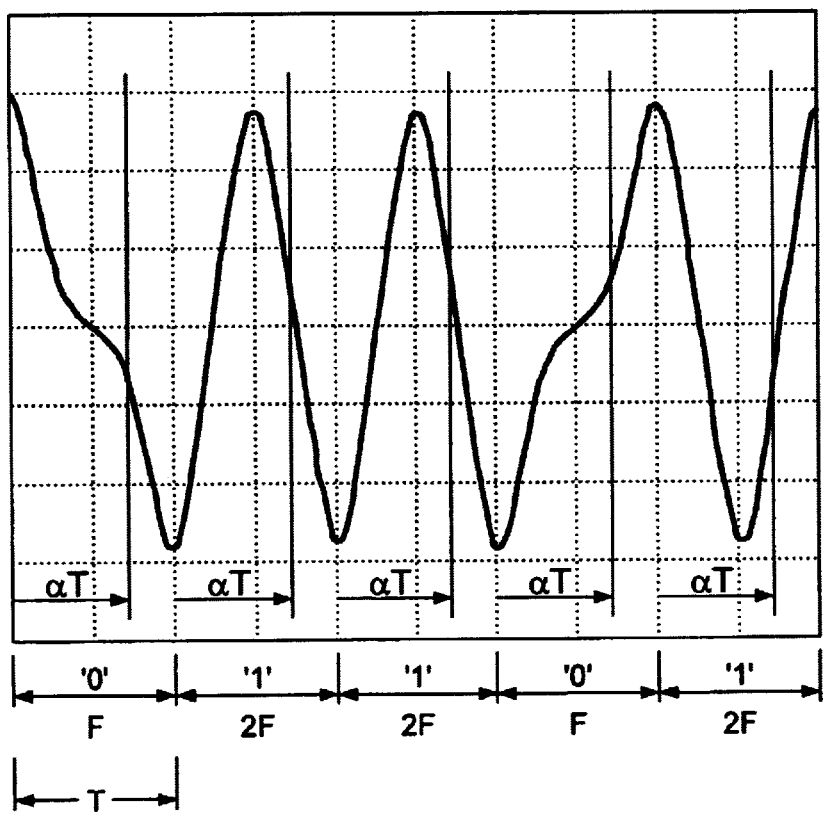
F I G. 2

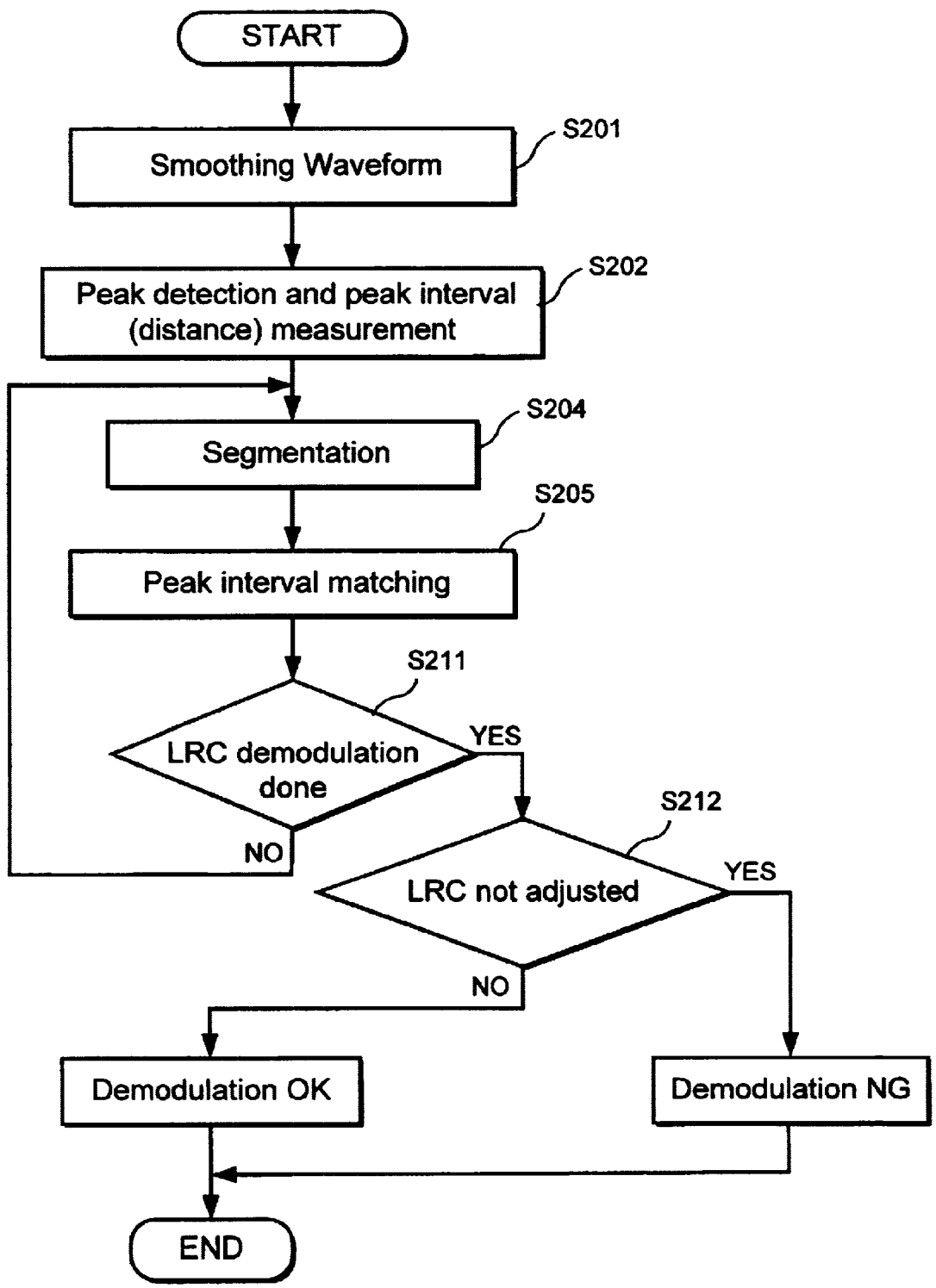
F I G. 3A

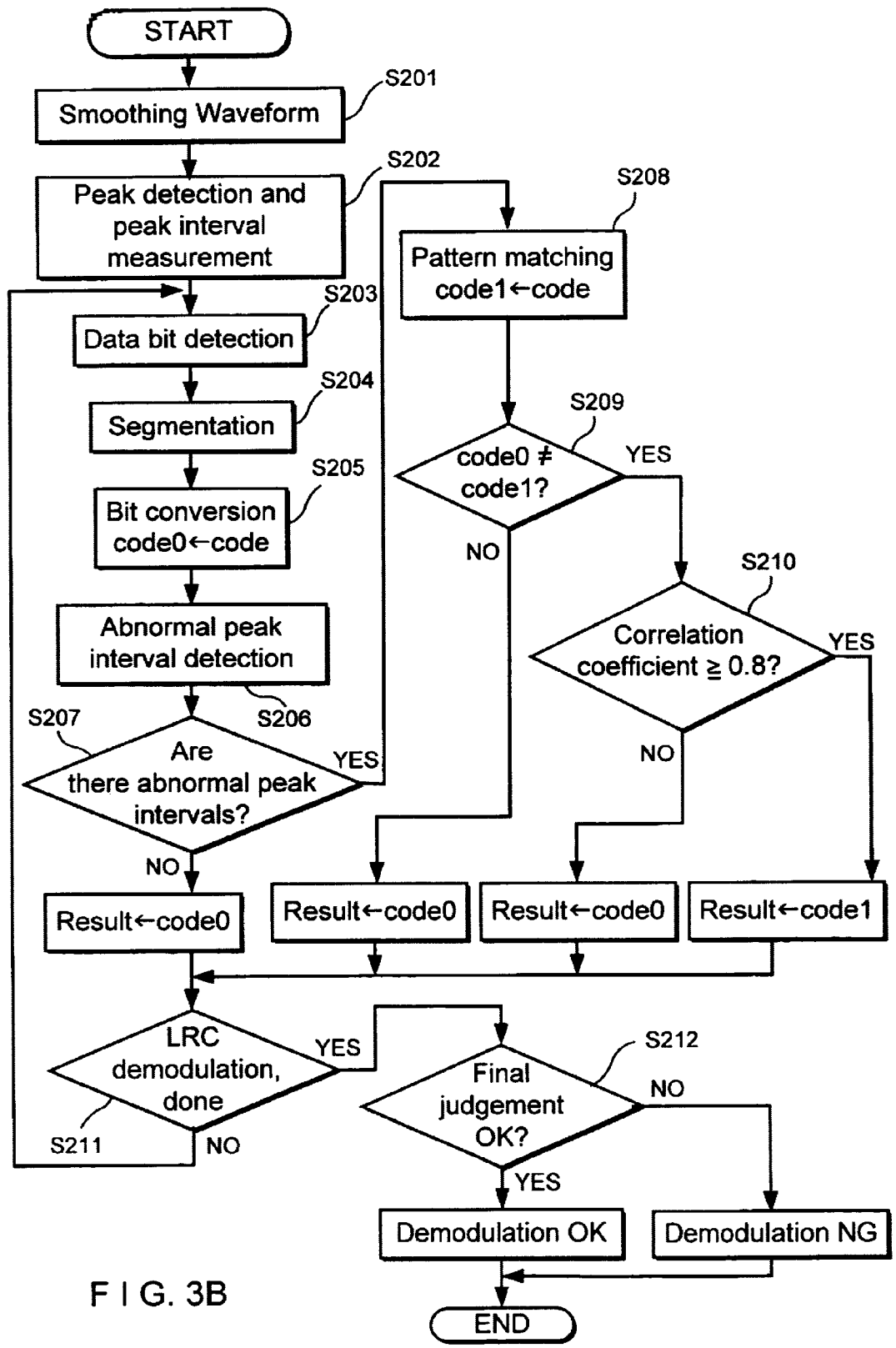
F I G. 3B

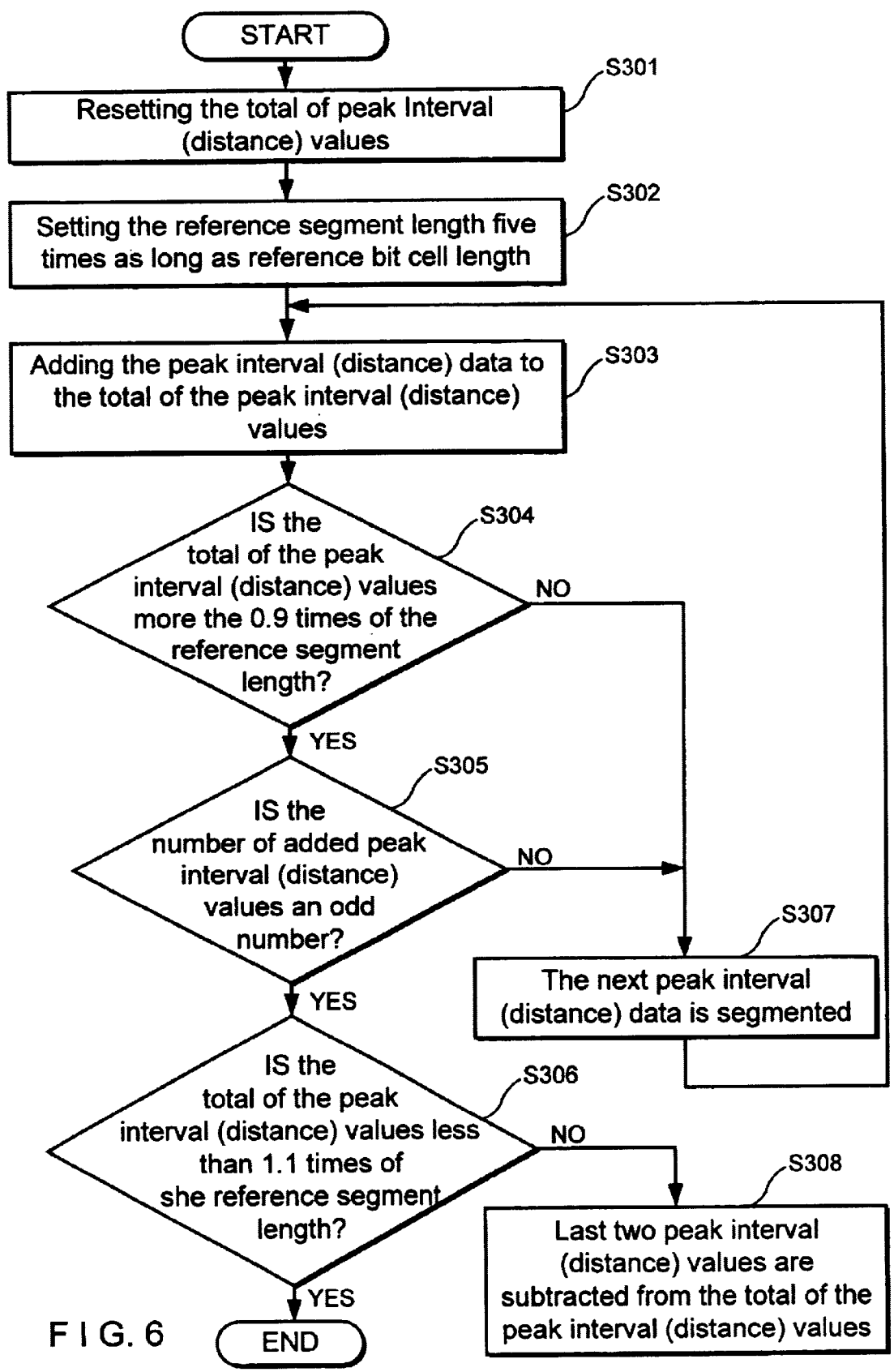
F I G. 6

| T0 | 10H | 2 | 2 | 2 | 2 | 1 | 1 | | | | |
|-----|-----|---|---|---|---|---|---|---|---|---|---|
| T1 | 01H | 1 | 1 | 2 | 2 | 2 | 2 | | | | |
| T2 | 02H | 2 | 1 | 1 | 2 | 2 | 2 | | | | |
| T3 | 13H | 1 | 1 | 1 | 1 | 2 | 2 | 1 | 1 | | |
| T4 | 04H | 2 | 2 | 1 | 1 | 2 | 2 | | | | |
| T5 | 15H | 1 | 1 | 2 | 1 | 1 | 2 | 1 | 1 | | |
| T6 | 16H | 2 | 1 | 1 | 1 | 1 | 2 | 1 | 1 | | |
| T7 | 07H | 1 | 1 | 1 | 1 | 1 | 1 | 2 | 2 | | |
| T8 | 08H | 2 | 2 | 2 | 1 | 1 | 2 | | | | |
| T9 | 19H | 1 | 1 | 2 | 2 | 1 | 1 | 1 | 1 | | |
| T10 | 1AH | 2 | 1 | 1 | 2 | 1 | 1 | 1 | 1 | | |
| T11 | 0BH | 1 | 1 | 1 | 1 | 2 | 1 | 1 | 2 | | |
| T12 | 1CH | 2 | 2 | 1 | 1 | 1 | 1 | 1 | 1 | | |
| T13 | 0DH | 1 | 1 | 2 | 1 | 1 | 1 | 1 | 2 | | |
| T14 | 0EH | 2 | 1 | 1 | 1 | 1 | 1 | 1 | 2 | | |
| T15 | 1FH | 1 | 1 | 1 | 1 | 1 | 1 | 1 | 1 | 1 | 1 |

| T0 | 64 | 64 | 64 | 64 | 32 | 32 |
|----|----|----|----|----|----|----|
| T0' | 2 | 2 | 2 | 2 | 1 | 1 |

| Template | Correlation value | |
|---|---|---|
| TP3 | -0.55896 | |
| TP5 | -0.4932 | |
| TP6 | 0.186319 | |
| TP7 | 0.317838 | |
| TP9 | -0.36168 | |
| TP10 | 0.317838 | |
| TP11 | 0.164399 | |
| TP12 | 0.602796 | |
| TP13 | 0.230159 | |
| TP14 | 0.909674 | MAX |
F I G. 9
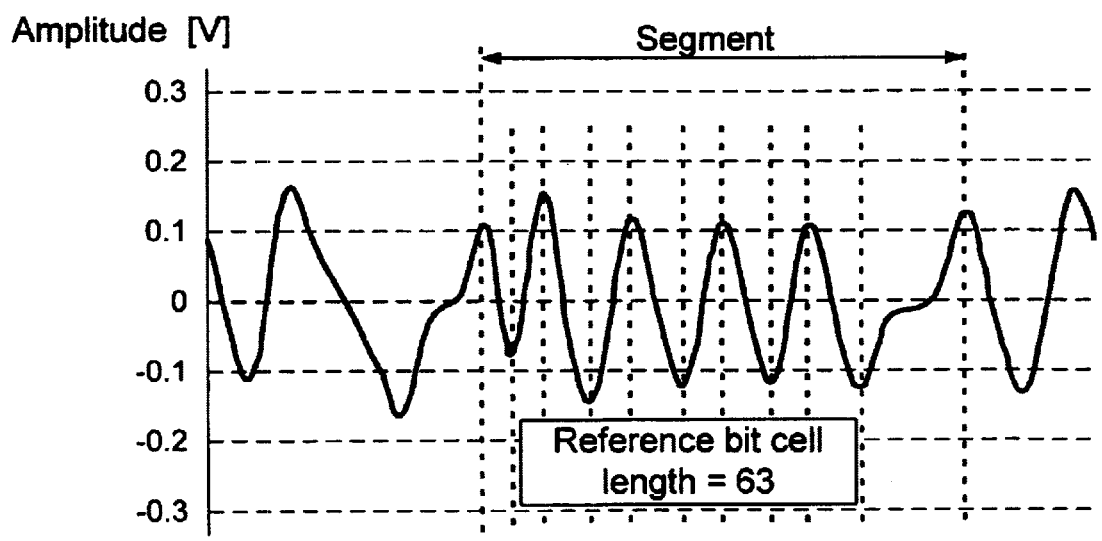
F I G. 12

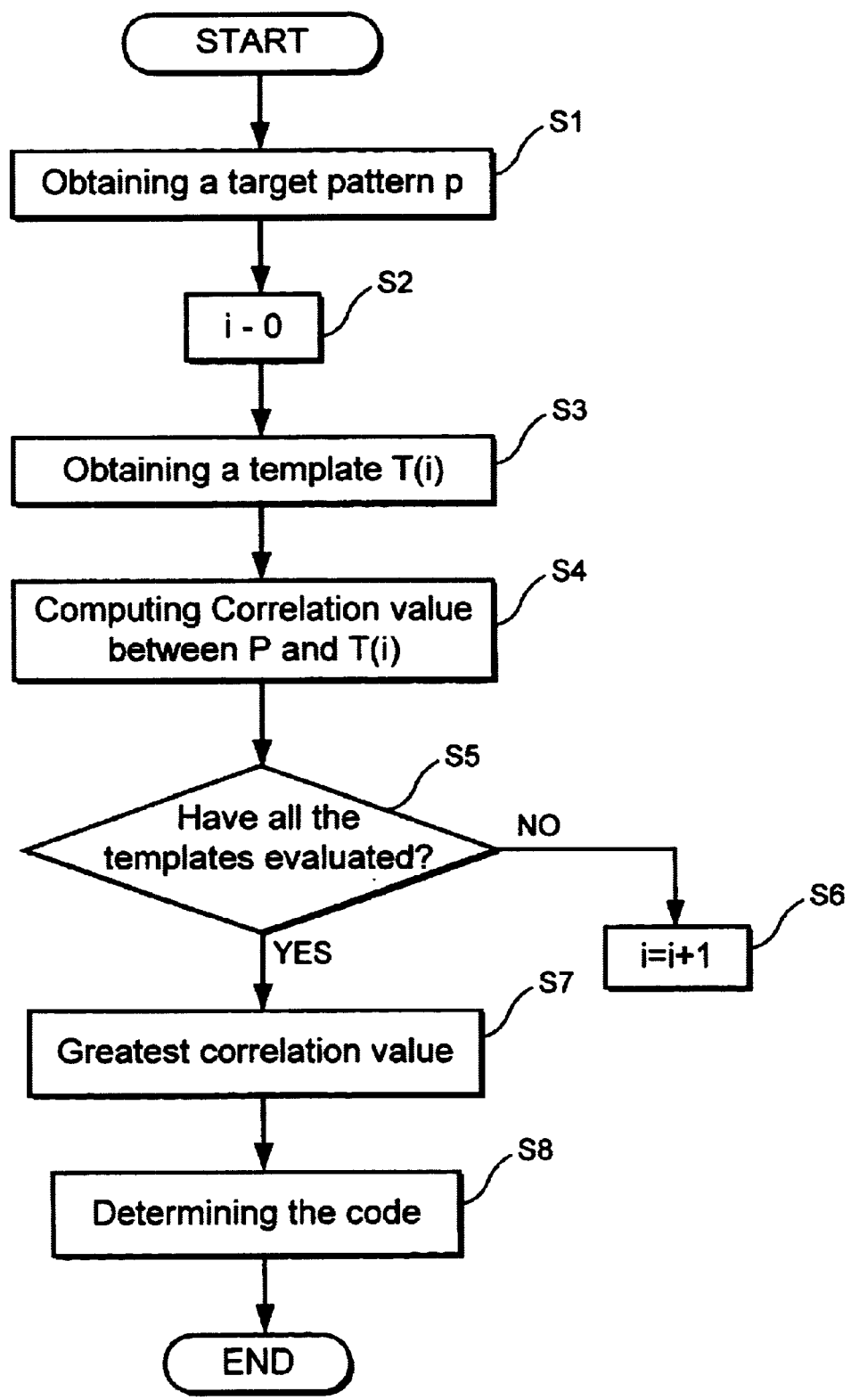
F I G. 10

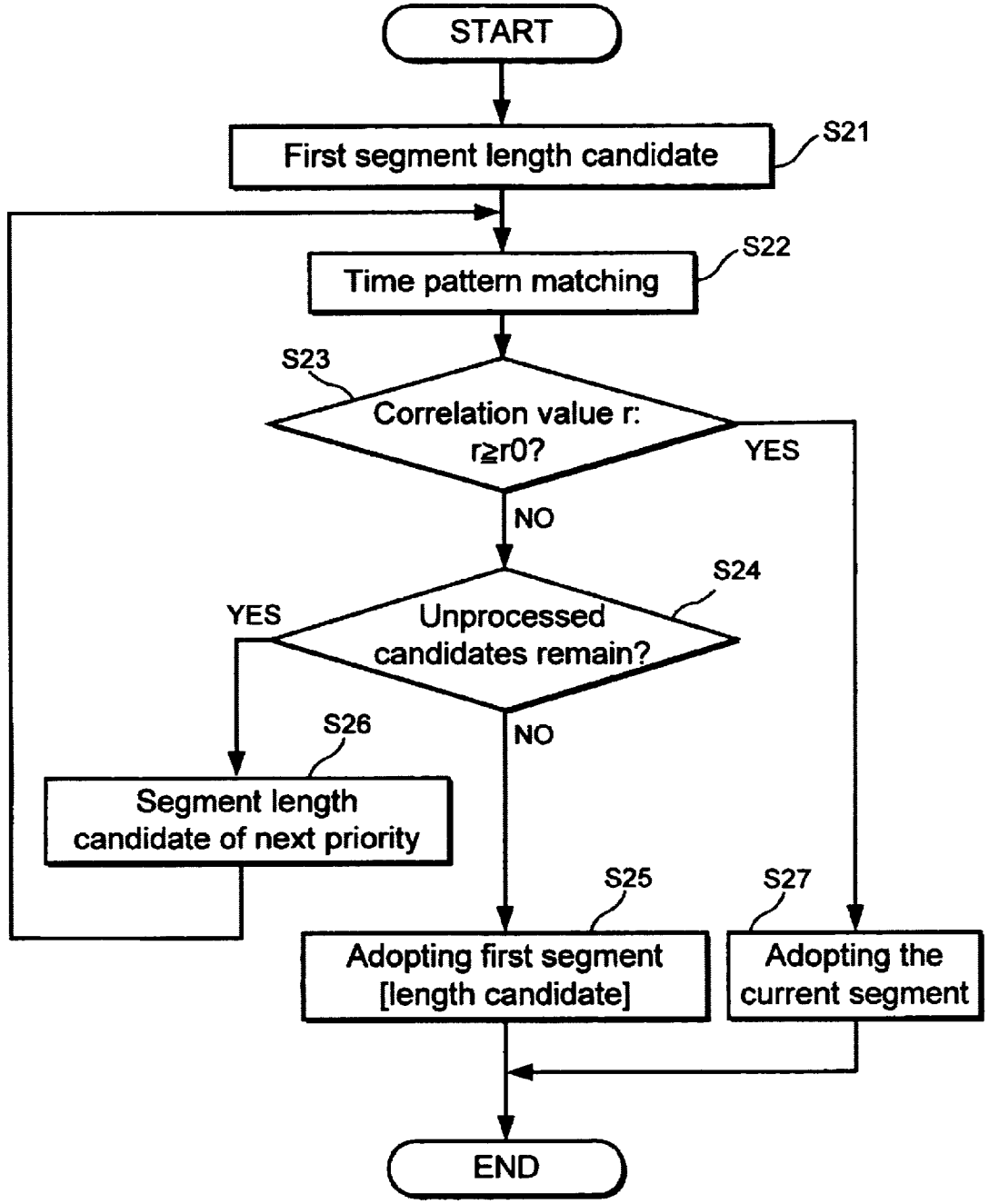
F I G. 16

DATA DEMODULATION

BACKGROUND OF THE INVENTION

The present invention relates to a method and apparatus for demodulating data signals recorded on magnetic cards, etc., by which data recorded by a two-frequency encoding method can be demodulated with high reliability.

General recording/reproducing devices such as magnetic card readers use a modulation method by which binary data signals composed of a combination of two kinds of frequencies, F and 2F, are stored in memory. The data recorded by the modulation method is reproduced in the following manner: a magnetic head is moved relative to a magnetic stripe on a magnetic card to reproduce the magnetically recorded data in a form of an analog reproduced signal; based on the signal waveform of the analog reproduced signal, the binary data are demodulated.

A magnetic stripe of a general magnetic card has not only a significant data region in which a recorded data is substantially stored, but also a sync bit region that comes before the significant data region, an STX code region that indicates the beginning of the recorded data, an ETX code region that comes after the significant data region and indicates the end of the data, an LRC code region, and another sync bit region.

FIG. 18 illustrates a general functional block diagram of a conventional data demodulation of this kind, and FIG. 19 shows a signal waveform of each block. In FIG. 18, an output signal of the magnetic head 11, which is obtained when a magnetic card 10 moves relative to the magnetic head, is amplified by two amplifiers 12 and 15. An output signal of the amplifier 12 is supplied to a peak detecting circuit 13 for peak detection, and a peak detection signal of the peak detecting circuit 13 is compared to zero level by a comparator 14 to detect zero crossing points thereof. An output signal of the other amplifier 15 is compared to zero level by a comparator 16 to detect zero crossing points thereof, and its output is input to a timing generation circuit 17. The timing generation circuit 17 changes the output level of the comparator 16 according to the level of the output signal of the comparator 16 which is observed at changing positions of the output signal of the comparator 14. The output signal of the timing generation circuit 17 is input to a data discriminating circuit or CPU 18 for a predetermined signal process to identify the character.

The operation of the functional block diagram illustrated in FIG. 18 will be described more specifically referring to FIG. 19 as well. FIG. 19(a) illustrates an example of a signal recorded on the magnetic card 10. The recorded signal is a binary data signal composed of a combination of two kinds of frequencies, F and 2F, and expresses the bit by "0" or "1" according to the existence of inversion of signal polarity within a time interval (distance) T equal to one bit. The example of FIG. 19(a) expresses "01101". FIG. 19(b) shows an example of the recorded signal of FIG. 19(a) which is read by the magnetic head 11 and amplified by the amplifiers 12 and 15. The output frequency of the amplifier 12 and 15 which corresponds to the recorded signal "1" is twice as long as that which corresponds to the recorded signal "0".

The peak detecting circuit 13 is composed of a differentiating circuit. Therefore, the peak detection output provides a signal waveform, as illustrated in FIG. 19(c) and, in which the zero crossing points appear at the peak positions of the output signal of the amplifier 12. This signal is compared to zero level by the comparator 14 and converted to a digital signal which inverts at the zero crossing positions in the peak detection waveform as illustrated in FIG. 19(d). The output waveform of the amplifier 15 is compared to zero level by the comparator 16 and converted to a digital signal which inverts at the zero crossing positions thereof, as illustrated in FIG. 19(e). The timing generation circuit 17 outputs the signal as illustrated in FIG. 19(f). In other words, the timing generation circuit 17 changes the output level of the comparator 16 according to the level of the output signal of the comparator 16 which is observed the comparator 16 at changing positions of the output signal of the comparator 14. The signal as illustrated in FIG. 19(f) is the digital signal expressing "01101" the same as that by the signal of FIG. 19(a). Thus, it is understood that the data signal recorded on the magnetic card is demodulated.

The above mentioned performance of reading data recorded on magnetic cards is affected by the condition of card, contamination and wear of the magnetic head, electric noise or mechanical noise from a motor, etc. In other words, a recording medium such as magnetic cards receives various stresses over repetitive use; as a result, the contamination or scratches on the recording medium may cause signals that originally did not exist. Also, basic information once written on the recording medium will not be overwritten even with repetitive use; over the time that the recording medium makes repeated contacts with the magnetic head, the magnetic force decreases, and therefore the signal intensity necessary for reproduction becomes insufficient, degrading accuracy of data reading. Further, the resolution power of the magnetic head is decreased due to wear of the magnetic head, causing peak shifts.

If the data read waveform has an abnormal portion as above, the performance of reading data recorded on the medium may be degraded, affecting correct data identification. Also, if peaks that originally do not exist appear or peaks appear at unexpected positions, the number of bits is falsely read because the abnormal waveform is decoded as it is, and the boundaries between the bits are shifted, affecting the successive bits in the character interval (distance) and causing a false reading therein.

In the aforementioned modulating method, as illustrated in FIG. 2, a constant reference time $\alpha T$ (where $0 \leq \alpha \leq 1$, i.e., $\alpha = 0.8$) is set with respect to a time interval (distance) T equal to one bit, and "0" or "1" is allocated to the bit by observing polarity inversion in the read signal within the reference time $\alpha T$. In other words, if there is no polarity inversion within the reference time $\alpha T$, the bit is defined as "0" by the frequency F; if there is a polarity inversion within the reference time $\alpha T$, the bit is defined as "1" by the frequency 2F. With this, the influence by the peak shift can be prevented to some extent.

However, like the example of FIG. 2, even if the reference time $\alpha T$ is set and the bit is identified by observing polarity inversion of the read signal within the reference time $\alpha T$, the aforementioned factors, such as peaks that originally do not exist or peaks appearing at unexpected positions, may cause a false reading.

Also, if a false reading occurs on only one bit in the bit line, it affects the successive bit line, causing errors in character determination. Then, the present inventors filed a patent application of a data demodulating method by which a false reading on one bit does not affect successive bit line. This invention is described in the specifications and drawings of prior Applications in which the binary data for each bit is determined by using an element of a character time interval for one character, which is determined by a reasonable method, thus reducing false readings and providing a highly reliable data demodulation.

Also, the present inventors have proposed a method for demodulating data for one character, in which each of peak interval values from the peak interval value line is successively added to determine the end of one character, two kinds of bit lines are obtained by comparing each of the peak interval values that constitute one character with the reference value in the right and opposite directions of sequence, and the data for one character is demodulated based on the two kinds of bit lines.

The present inventors have also proposed a data demodulating method in which a set of ideal reference waveform data of reproduced signal waveforms are prepared in advance for characters; a reproduced signal corresponding to the magnetically recorded data is divided into segments, each of which has the length equal to one character; at least one of the segments is compared to each of said reference waveform data by a pattern matching to determine the degrees of similarities; and the character corresponding to the reference waveform data showing the highest degree of similarity is determined as the character expressed by the segment in a prior application.

According to the inventions of the above patent applications, reliability of data demodulation can be increased. However, even the above inventions may have difficulties to correctly read recorded data on a recording medium depending on the condition of abnormality of the read signal. As shown in FIG. 4, if there are peak shifts in the read signal waveform, the original binary data line pattern for one character, "01110", for example, may be falsely read as "00111" Consequently, the character may falsely be selected for the segment. Thus, a measure for errors is needed. Also, in the example of FIG. 4, as a result of false bit conversion on the second bit, the ends of the bits after the third bit are shifted, thus affecting the successive bits in the character interval. Thus, false readings may be caused on the successive bits in the character interval. Therefore, the inventions of the above patent applications can be more improved.

The present invention is devised considering the above problems in prior art. An objective thereof is to provide highly reliable data demodulating method and data demodulating apparatus, by which even when a read signal waveform includes peak shifts, recorded data can be accurately demodulated and false readings are greatly reduced.

BRIEF DESCRIPTION OF THE FIGURES

FIG. 1 is a functional block diagram of a data demodulating method and apparatus of the present invention.

FIG. 2 is a waveform diagram to explain an F2F modulating method.

FIG. 3A is a flowchart showing a first embodiment of this data demodulating invention.

FIG. 3B is a flowchart showing a second embodiment of this data demodulating invention.

FIG. 6 is a flowchart of a segmentation of one character in the present invention.

FIG. 9 is a sequence diagram in which the results of the comparison between reference line patterns and a reproduced signal peak interval value line are shown by similarities therebetween.

FIG. 10 is a flowchart of an example of pattern matching of the present invention.

FIG. 12 is a waveform diagram to explain an example of a false reading in the data demodulation due to extra peaks.

FIG. 16 is a flowchart showing how a segment is selected among the plurality of the above segment length candidates.

DESCRIPTION OF FIRST EMBODIMENT

Figure 4:
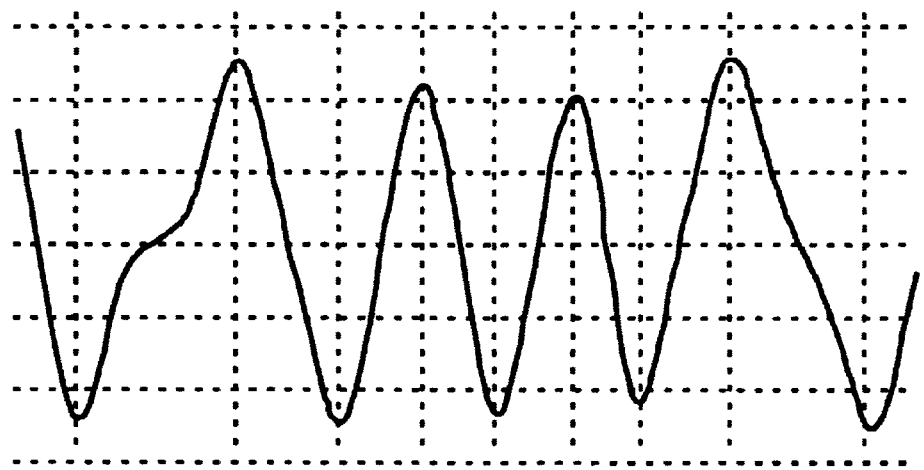
FIG. 4 is a waveform diagram of an example of a reproduced waveform and its bit conversions during data demodulation.

Embodiments of data demodulating method and data demodulating apparatus of the present invention are described referring to FIG. 1 through FIG. 17. FIG. 1 illustrates a block diagram of a configuration example of hardware used in the present invention. In FIG. 1, on a magnetic stripe of a magnetic recording medium, i.e., magnetic card 20, binary data defined by a frequency modulated signal composed of a combination of high and low frequencies, F and 2F are recorded. The binary data for one character is composed of a predetermined number of bits and a parity bit; the data for a plurality of characters are recorded. FIG. 1 shows an example of reproduction of recorded data from the magnetic card 20; when the magnetic card 20 is inserted to a recording/reproducing device, a transport roller 26 is driven by a motor (not shown), and transports the magnetic card 20 while making a magnetic stripe on the magnetic card 20 contact with a magnetic head 21 which reads the data signal recorded on the magnetic stripe.

An output signal of the magnetic head 21 is amplified to the required signal intensity by an amplifier 22, sampled and converted to a digital signal by an A/D converter 23, and stored in a buffer memory 24. The data stored in the buffer memory 24 is read by CPU 25 for a demodulation process. The demodulation process by CPU 25 will be described next.

As shown in FIG. 3A, the waveform is smoothed to remove spike noise in step 201 (hereinafter, step will be denoted to as "S40", "S202" . . . ). In S202, peaks are detected successively, and a time interval (distance) is measured between the newly detected peak and the previous peak. The above steps are repeated until the LRC is demodulated, i.e., over the entire length of the magnetic stripe on the magnetic card to generate a data line of the interval (distance) between peaks (hereinafter denoted to as peak interval data line). This is the data bit detection in S203.

Figure 5:
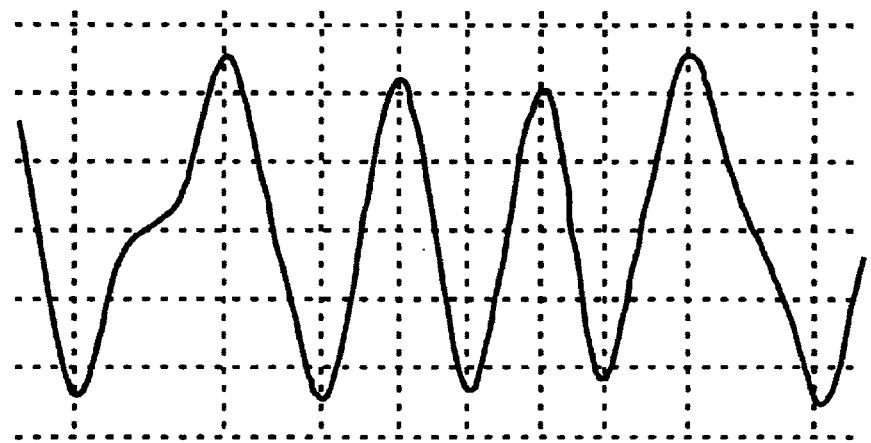
FIG. 5 is a waveform diagram of the example of the reproduced waveform and its peak interval value line during data demodulation.

FIG. 5 illustrates an example of a read waveform and an example of the peak interval (distance) data line (hereinafter denoted to as peak interval (distance) value line) of the waveform. By ISO standard, for example, a magnetic card has the first and third tracks having recording density of 210 BPI; if the card transporting speed is 190 mm/s, the time equal to one bit is 636.6 μs. If the sampling rate for A/D converting an analog waveform is 10 μs, the logic value of data points included in one bit is 63.7. In the example of FIG. 5, the peak interval (distance) data line is as "65", "44", "34", "31", "31" . . . .

Segmentation is performed based on the peak interval (distance) data line. Segmentation means that the reproduced waveform data is divided into segments, each of which corresponds to one character (See S204 in FIG. 3A). A specific example of steps of the segmentation will be described referring to FIG. 5 and FIG. 7. The waveform illustrated in FIG. 5 is of the third track by ISO standard. The ISO third track expresses one character with total five bits consisting of four data bits and one parity bit. Because of odd parity, the number of "0" bits is always even. Therefore, the number of the peak interval (distance) values that constitute a segment is limited to six, eight, or ten.

When the number of the peak interval (distance) values is six, the segment corresponds to a character code consisting of four "0" bits and one "1" bit. When the number of the peak interval (distance) values is eight, the segment corresponds to a character code consisting of two "0" bits and three "1" bits; when ten, all the five bits represent "1" for a character code.

Figures 7, 8:
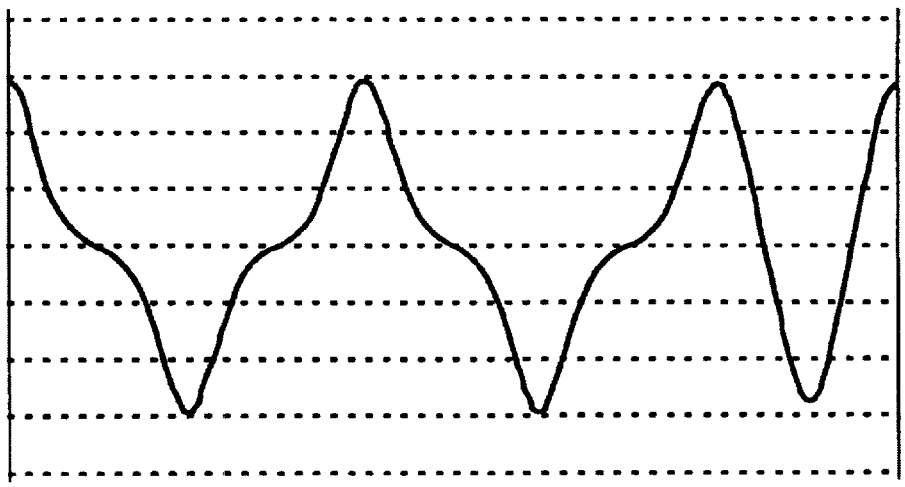
FIG. 7 is a sequence diagram of a template used for pattern matching in the data demodulating method of the present invention.
FIG. 8 is a waveform diagram of an example a specific template for one character, that can be incorporated in the present invention.

FIG. 7 shows an example of the above segmentation. First, the total of the peak interval (distance) values is reset to zero (S301). Next, a reference segment length is set in S302. Since one character of the recorded data is expressed with five bits as described above, the reference segment length is set five times as long as a reference bit cell length. The reference bit cell length is obtained by measuring the waveform of the sync bit portion consisting of successive "0" bits, for example.

Then, the first peak interval (distance) value of the segment to be coded is added to the total of the peak interval (distance) values in S303. Next, it is determined if the total of the peak interval (distance) value exceeds 0.9 times of the reference segment length. In the example of FIG. 5, since the total of the peak interval values is "65" and never exceeds 0.9 times of the reference segment length at the point when the first peak interval (distance) value is added, the next peak interval (distance) data is picked out in S307 and added to the peak interval (distance) value total, returning to S303. After the above steps are repeated several times, it is determined in S304 that the total of the peak interval (distance) values exceeds 0.9 times of the reference segment length; at that time, it is checked in S305 if the number of the peak interval (distance) values which have been added is even.

If the number is not even at the determination in S305, the next peak interval (distance) data is picked out in S307, and S304 and S305 are repeated. If the number of the peak interval (distance) values is determined as an even number in S305, the operation proceeds to S306 to check if the total of the peak interval (distance) values is less than 1.1 times of the reference segment length. If the total of the peak interval (distance) values is less than 1.1 times of the reference segment length, the segmentation for one character ceases here. If the total of the peak interval (distance) values is more than 1.1 times of the reference segment length, it can be determined that the peak interval (distance) value total is too great; therefore, the last two of the peak interval (distance) values are subtracted from the peak interval (distance) value total and the value of the pointer that counts the number of the peak interval (distance) values is reduced by "2". The reason why two of the peak interval (distance) values are subtracted is to satisfy the condition that the number of the peak interval (distance) values should be only even.

A segment for one character is obtained in the above manner.

The total of the peak interval (distance) values is determined within 0.9~1.1 times of the reference segment length as above because it is experimentally understood that, as long as the total value is within this range, most of the segments, each of which corresponds to one character, can be obtained without errors.

As described above, the reproduced signal is divided into segments, each of which has the length equal to one character of the recorded data, and a pattern matching is performed in S205 in FIG. 3A based on the peak interval values, taking a segment as a process unit.

Here, a reference line pattern composed of peak interval values that constitute one character is pre-stored for each character; the reproduced signal waveform is converted to a digital signal by an AD conversion; time intervals are measured between successive peaks of the digitized reproduced signal; time pattern matching is performed to compare each of the peak interval values that constitute one character with the reference line pattern; and the character corresponding to the reference line pattern having the highest degree of similarity is determined as the character. Time pattern matching is described more specifically hereinafter.

The functional portion of pattern matching is comprised of template, matcher, and data determining means, etc. The functional portion can be operated by CPU or a micro computer as shown in FIG. 1. FIG. 7 shows an example of the template. In the ISO second and third tracks, one character is expressed by five bits consisting of four data bits and one parity bit. Therefore, the template shown in FIG. 7 has sixteen patterns, "T0", "T1", . . . "T1" for total. FIG. 8 shows the waveform of the pattern "T0", a peak interval value line of the waveform, and the ratio of each peak interval value. This is an ideal waveform for the character code "10H", and the peak interval value line is as T0={64, 64, 64, 64, 32, 32}. "64" can be used for the magnetic inversion distance of the binary data "0" and "34" can be used for that of the binary data "1" as they are; however, if the condition that the ratio of the magnetic inversion distance is 2:1 is satisfied, T0'={2, 2, 2, 2, 1, 1} may be used as shown in FIG. 8. The example of FIG. 7 shows the peak interval value line for each of the character code patterns T0, T1, . . . , T15, by the ratio of magnetic inversion distance and the corresponding character code as well.

A specific example of pattern matching using the above template is described referring to FIG. 4, FIG. 5 and FIG. 10. Note that the waveforms illustrated in FIG. 4 and FIG. 5 are the same; FIG. 4 shows correct bit conversion and false bit conversion of the waveform. FIG. 5 shows a peak interval value line obtained by measuring the waveform. First, peak interval values P of a target pattern are obtained in S1 in FIG. 10. In the example of FIG. 5, the line of the peak interval values P is {65, 44, 34, 31, 31, 25, 38, 58}. Thus, P consists of eight components; from the templates of sixteen patterns shown in FIG. 7, ten templates {[TP3, TP5, TP6, TP7, TP9, TP10, TP11, TP12, TP13, and TP14}, each of which respectively consists of eight components, are obtained as the templates for comparison, as shown in FIG. 9 (S3).

Next correlation values are calculated between the target pattern and the selected ten templates. The calculation of the correlation value is obtained by the following equation on which rk is a correlation value; Sn is a segment; Tk is a template.

$$rk = \frac{\sum (Sn_1 - Sn_m)(Tk_1 - Tk_m)}{\sqrt{\sum (Sn_1 - Sn_m)^2} \sqrt{\sum (Tk_1 - Tk_m)^2}} \quad (k = 0 \ldots 15)$$

where k=0~15
Sn=(Sn$_1$ . . . Sn$_n$)
Tk=(Tk$_1$ . . . Tk$_n$)
Sn$_m$, Tk$_m$ respectively represent the averages of Sn$_1$ and Tk$_1$–1.0<rk≦1.0

After calculating the correlation values for all the ten templates (S5), the greatest correlation value is found among the obtained correlation values (S7). FIG. 9 shows each of the correlation values obtained by calculation of comparing the waveform illustrated in FIG. 4 and FIG. 5 with the selected ten templates. According to this example, the correlation value with the template TP14 is approximately 0.9, which is the greatest; therefore, it is determined that the character represented by this segments "OEH" (code "O111OB") corresponding to the template TP14. This character code agrees with the original bit converted value line of the waveform illustrated in FIG. 4; it is understood that, even if the waveform contains a peak shift (jitter) as shown in FIG. 4, the signal waveform can be read correctly.

As described in S211 of FIG. 3A, peak detection, peak interval measurement, segmentation, and peak interval matching (pattern matching) operations are repeated until the LRC is demodulated. After the LRC is demodulated, it is checked in S212 as a final step. In other words, the result of the entire demodulation is determined.

According to the above described segmentation and peak interval matching (pattern matching), a reference line pattern composed of peak interval values that constitute one character is pre-stored for each character; time intervals of the reproduced signal are measured; each of the peak interval values that constitute one character is compared with the reference line patterns to provide similarities; and the character corresponding to the reference line pattern showing the highest degree of similarity is determined as the character [expressed by the segment]. Therefore, even if the signal waveform contains an abnormal portion, such as a local change of peak interval, which cannot be correctly determined by the bit conversion, a whole block as a segment that constitute one character is hardly affected by the local change in the peak interval. Thus, the character can be correctly determined, increasing reliability of data demodulation.

Also, the reference line patterns with which the target pattern is compared are selected from the reference line patterns, based on the number of the peak intervals that constitutes one character; therefore, the reference line patterns are narrowed down before the pattern matching, and accordingly the target pattern is compared with only the selected reference line patterns. Thus, the pattern matching can be performed in a simple manner, further increasing reliability of data demodulation.

The reproduced signal waveform is converted to a digital signal by an AD conversion; a peak interval value line is created by measuring time intervals between successive peaks of the digitized reproduced signal; the end of one character is determined by successively adding each of the peak interval values in the peak interval value line; the peak interval value line equal to one character is determined as a target pattern, and the determined target pattern is compared with the reference line patterns. In this manner, the end of one character can be accurately determined, further increasing reliability of data demodulation.

Furthermore, a character time interval is predetermined for one character of recorded data by a predetermined number of bits as a given range; the end of one character is determined by a peak position within the character time interval for one character; it is detected if the number of peak interval values up to the mentioned peak position within the character time interval satisfies the characteristic condition of parity bit; when the condition is not satisfied, the next peak interval value is added to determine the end of one character. In this manner, the end of one character can be accurately determined, further increasing reliability of data demodulation.

Figure 17:
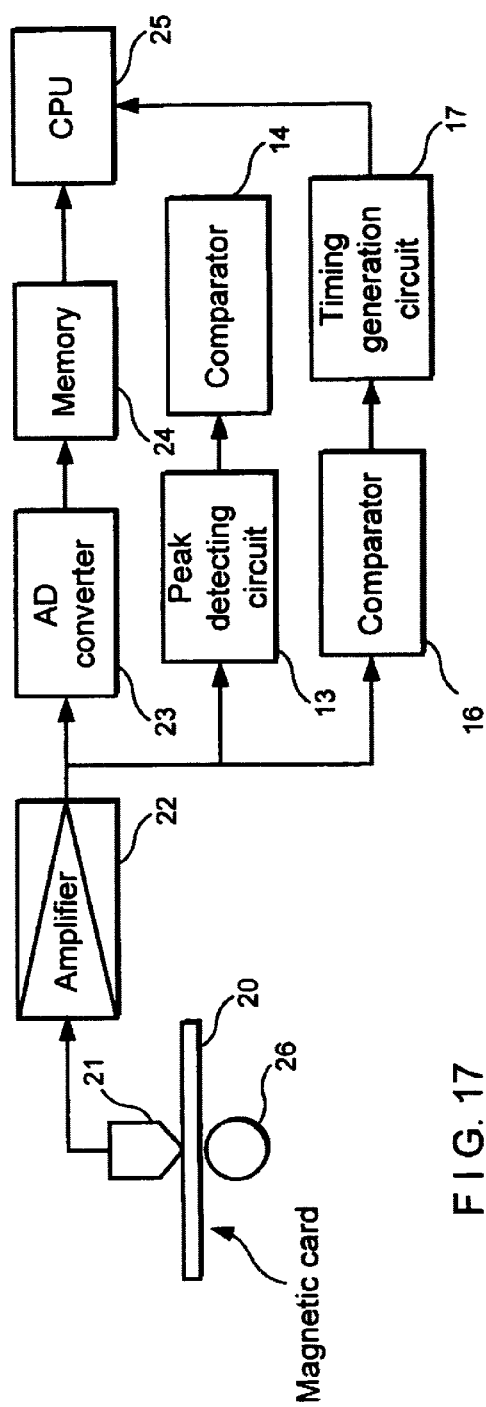
FIG. 17 is a flowchart of another embodiment of the data demodulation of the present invention.

Next, another embodiment illustrated in FIG. 17 is described. In this embodiment, the functional block diagram shown in the upper row consisting of amplifier 22, AD converter 23, memory 24, and CPU 25 is configured the same as the embodiment of FIG. 1. The functional block diagram shown in the lower row consisting of peak detecting circuit 13, comparator 14, comparator 16, and timing generation circuit 17 is essentially the same as the conventional example of FIG. 18. In other words, this embodiment is a combination of the embodiment of FIG. 1 and the conventional method of FIG. 18, whereby a more reliable data demodulation can be performed.

Figure 18:
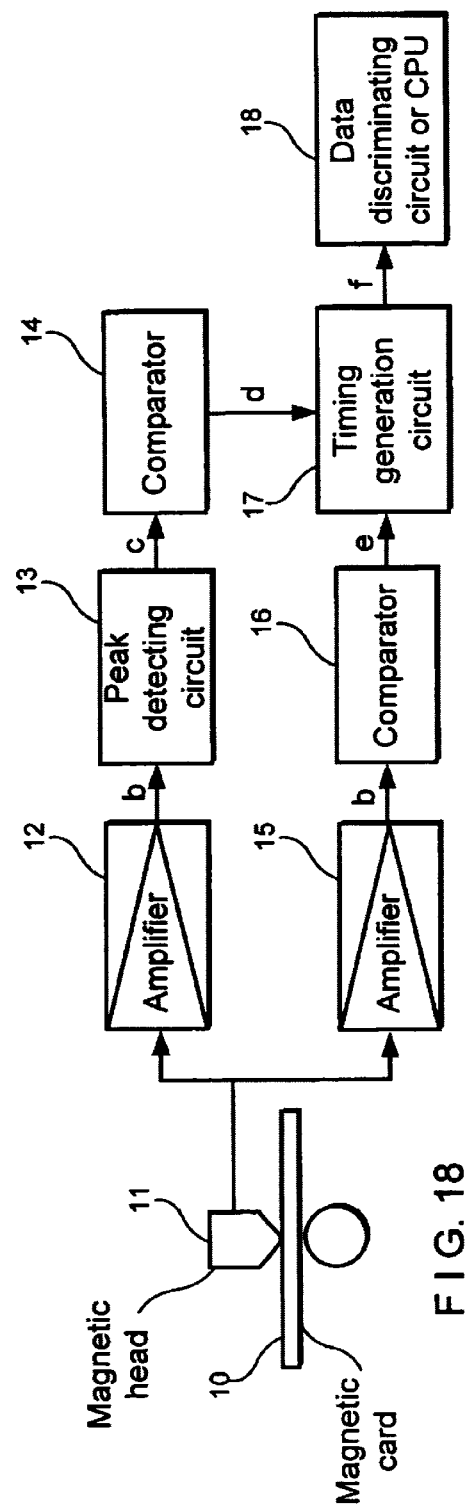
FIG. 18 is a functional block diagram of an example of a conventional data demodulating method.
Figure 19:
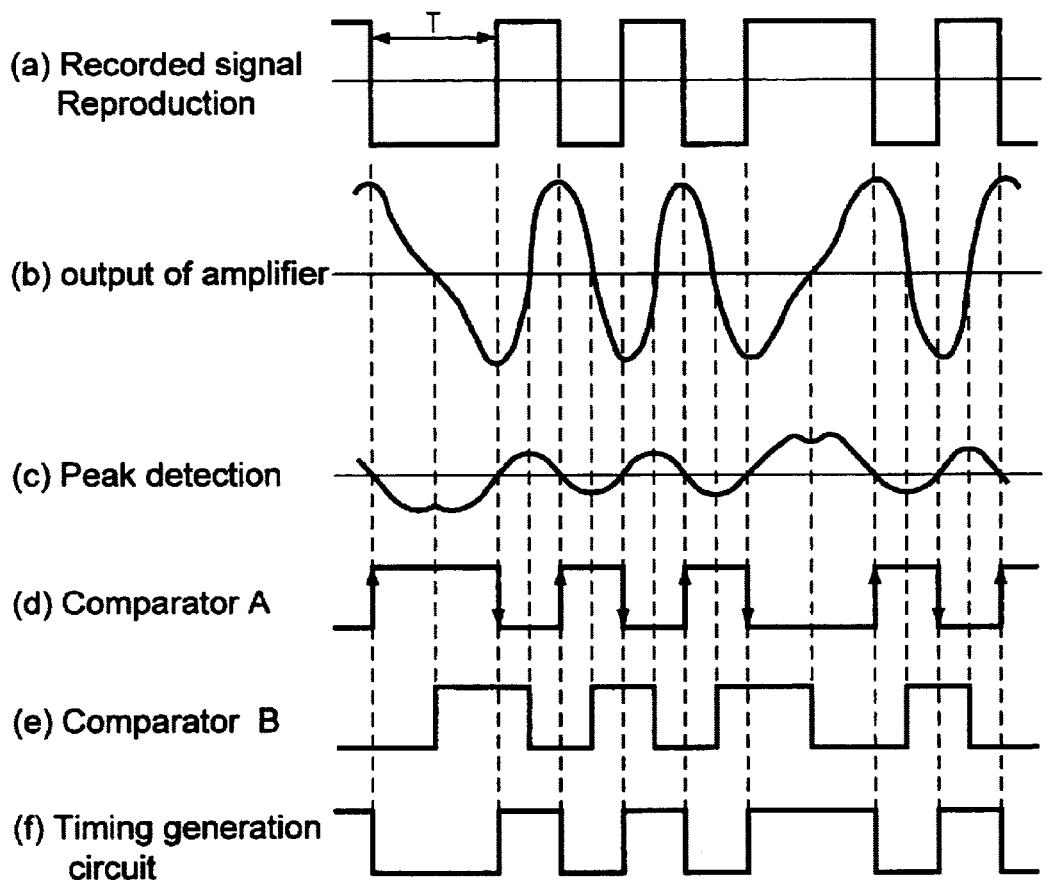
FIG. 19 is a timing chart to explain an operation of the conventional data demodulating method.

In the conventional functional block diagram of FIG. 18, the reading data pulse output of the analog circuit is demodulated in the data discriminating circuit or CPU 18 through the aforementioned conventional method. However, leaving the functional block diagram in the conventional example of FIG. 18 as it is, the data demodulating method by the data discriminating circuit or CPU 18 can be replaced by the data demodulating method of the present invention.

EFFECTS OF THE INVENTION

According to this invention, a reference line pattern for each character, composed of peak interval values of bits that constitute one character, is prepared in advance; time intervals are measured between successive peaks of said reproduced signal; and each of said peak interval values that constitute one character is compared with said reference line patterns by a pattern matching to determine the character corresponding to said reference line pattern having the highest degree of similarity as the character. Therefore, even when the signal waveform contains an abnormal portion, such as a local change in peak interval (values), that cannot be correctly determined by a bit conversion, the characters can be correctly determined, increasing reliability of data demodulation.

According to this invention, reference line patterns are selected from the reference line patterns for comparison according to the number of peak intervals that constitute one character. Therefore, the reference line patterns are narrowed down before the pattern matching, and [the target line pattern] is compared only with the selected reference line patterns. Thus, the pattern matching can be performed in a simple manner, further increasing reliability of data demodulation.

According to this invention, the reproduced signal waveform is converted into a digital signal by an AD conversion; time intervals are measured between successive peaks of the digitized reproduced signal to create a peak interval value line; the end of one character is determined by successively adding each of the peak interval values of the peak interval value line; and each of the peak interval values that constitute one character is compared with the reference line patterns. Thus, the end of one character can be accurately determined, increasing reliability of data demodulation.

According to this invention, a character time interval is defined for one character of the recorded data by a predetermined number of bits as a given range; the end of one character is determined based on a peak position within the character time interval for one character; it is determined if the number of peak interval values up to the peak position within the character time interval satisfies the characteristic condition of parity bit; when the condition is not satisfied, the next peak interval value is added to determine the end of one character. Thus, the end of one character can be determined accurately, further increasing reliability of data demodulation.

DESCRIPTION OF THE SECOND EMBODIMENTS

Objects of the above mentioned filed inventions are to perform accurate segmentations, i.e., to correctly analyze reproduced waveform data and accurately divide the waveform data into segments, each of which is equal to one character. The above first embodiment provides a more reliable data demodulation by preparing in advance a reference line pattern composed of peak interval values, each of which corresponds to one bit and is a constituent of one character; measuring time intervals between successive peaks of the reproduced signal; performing pattern matching by comparing each of the peak interval values that constitute one character with the reference line pattern; and determining the character corresponding to the reference line pattern having the highest similarity as the character.

According to the above patent applications, reliability of data demodulation can be increased. However, even the above inventions may have difficulties to correctly read recorded data on a recording medium depending on the condition of abnormality of the read signal. For example, if there are peak shifts in the read signal waveform, the binary data line pattern for one character may be falsely read. Consequently, the character may be falsely selected for the segment. Thus, a countermeasure for reading errors is needed. Also, if the bit conversion is falsely performed on the second bit, the boundaries are shifted after the third bit, affecting the successive bits in the character interval and causing false readings therein. Thus, the inventions of the above patent applications should be further improved.

Embodiments of data demodulating method and data demodulating apparatus of the present invention are described referring to FIG. 1 through FIG. 16. FIG. 1 illustrates a block diagram of a configuration example of hardware used in the present invention. In FIG. 1, on a magnetic stripe of a magnetic recording medium, i.e., magnetic card 20, binary data defined by a frequency modulated signal composed of a combination of high and low frequencies, F and 2F are recorded. The binary data for one character is composed of a predetermined number of bits and a parity bit; the data for a plurality of characters are recorded. FIG. 1 shows an example of reproduction of recorded data from the magnetic card 20; when the magnetic card 20 is inserted to a recording/reproducing device, a transport roller 26 is driven by a motor (not shown), and transports the magnetic card 20 while making a magnetic stripe on the magnetic card 20 contact with a magnetic head 21 which reads the data signal recorded on the magnetic stripe.

An output signal of the magnetic head 21 is amplified to the required signal intensity by an amplifier 22, sampled and converted to a digital signal by an A/D converter 23, and stored in a buffer memory 24. The data stored in the buffer memory 24 is read by CPU 25 for a demodulation process. The demodulation process by CPU 25 will be described next.

As shown in FIG. 3B, the waveform is smoothed to remove spike noise in step 201 (hereinafter, step will be denoted to as "S40", "S202" . . . ). In S202, peaks are detected successively, and a time interval (distance) is measured between the newly detected peak and the previous peak. The above steps are repeated until the LRC is demodulated, i.e., over the entire length of the magnetic stripe on the magnetic card to generate a data line of the interval (distance) between peaks (hereinafter denoted to as peak interval data line). This is the data bit detection in S203.

FIG. 5 illustrates an example of a read waveform and an example of the peak interval (distance) data line (hereinafter denoted to as peak interval (distance) value line) of the waveform. By ISO standard, for example, a magnetic card has the first and third tracks having recording density of 210 BPI; if the card transporting speed is 190 mm/s, the time equal to one bit is 636.6 ps. If the sampling rate for A/D converting an analog waveform is 10 $\mu$s, the logic value of data points included in one bit is 63.7. In the example of FIG. 5, the peak interval (distance) data line is as "65", "44", "34", "31", "31" . . . .

Segmentation is performed based on the peak interval (distance) data line. Segmentation means that the reproduced waveform data is divided into segments, each of which corresponds to one character (See S204 in FIG. 3). A specific example of steps of the segmentation will be described referring to FIG. 5 and FIG. 6. The waveform illustrated in FIG. 5 is of the third track by ISO standard. The ISO third track expresses one character with total five bits consisting of four data bits and one parity bit. Because of odd parity, the number of "0" bits is always even. Therefore, the number of the peak interval (distance) values that constitute a segment is limited to six, eight, or ten.

When the number of the peak interval (distance) values is six, the segment corresponds to a character code consisting of four "0" bits and one "1" bit. When the number of the peak interval (distance) values is eight, the segment corresponds to a character code consisting of two "0" bits and three "1" bits; when ten, all the five bits represent "1" for a character code.

FIG. 6 shows an example of the above segmentation. First, the total of the peak interval (distance) values is reset to zero (S301). Next, a reference segment length is set in S302. Since one character of the recorded data is expressed with five bits as described above, the reference segment length is set five times as long as a reference bit cell length. The reference bit cell length is obtained by measuring the waveform of the sync bit portion consisting of successive "0" bits, for example.

Then, the first peak interval (distance) value of the segment to be coded is added to the total of the peak interval (distance) values in S303. Next, it is determined if the total of the peak interval (distance) value exceeds 0.9 times of the reference segment length. In the example of FIG. 5, since the total of the peak interval values is "65" and never exceeds 0.9 times of the reference segment length at the point when the first peak interval (distance) value is added, the next peak interval (distance) data is picked out in S307 and added to the peak interval (distance) value total, returning to S303. After the above steps are repeated several times, it is determined in S304 that the total of the peak interval (distance) values exceeds 0.9 times of the reference segment length; at that time, it is checked in S305 if the number of the peak interval (distance) values which have been added is even.

If the number is not even at the determination in S305, the next peak interval (distance) data is picked out in S307, and S304 and S305 are repeated. If the number of the peak interval (distance) values is determined as an even number in S305, the operation proceeds to S306 to check if the total of the peak interval (distance) values is less than 1.1 times of the reference segment length. If the total of the peak interval (distance) values is less than 1.1 times of the reference segment length, the segmentation for one character ceases here. If the total of the peak interval (distance) values is more than 1.1 times of the reference segment length, it can be determined that the peak interval (distance) value total is too great; therefore, the last two of the peak interval (distance) values are subtracted from the peak interval (distance) value total and the value of the pointer that counts the number of the peak interval (distance) values is reduced by "2". The reason why two of the peak interval (distance) values are subtracted is to satisfy the condition that the number of the peak interval (distance) values should be only even.

A segment for one character is obtained in the above manner.

The total of the peak interval (distance) values is determined within 0.9~1.1 times of the reference segment length as above because it is experimentally understood that, as long as the total value is within this range, most of the segments, each of which corresponds to one character, can be obtained without errors.

Regarding the segment picked out in the above manner, each of the peak interval (distance) values, which is a constituent of the segment, is checked and converted to a binary value. Here, this operation is called a bit conversion. S205 in FIG. 3 explains the bit conversion, and FIG. 11 describes it in more detail. The bit conversion shown in FIG. 11 will be described referring to FIG. 12 that includes an abnormal waveform. In the example of FIG. 12, the peak interval data proceed as "19" "21" "32" "29" . . . "34" "69", in which the abnormal data is contained. In S40, the total of the peak interval (distance) values is reset to "0", and the number of unprocessed bits is set to 7 or 5. In S41, the reference cell length is set by calculating (segment length−peak interval (distance) value total)/the number of unprocessed bits; the reference boundary value be set by calculating (peak interval (distance) value total+reference cell length); a threshold A be set by calculating (reference boundary value−reference cell length×0.3); and a threshold B be set by calculating (reference boundary value+reference cell length×0.3).

Figure 11A:
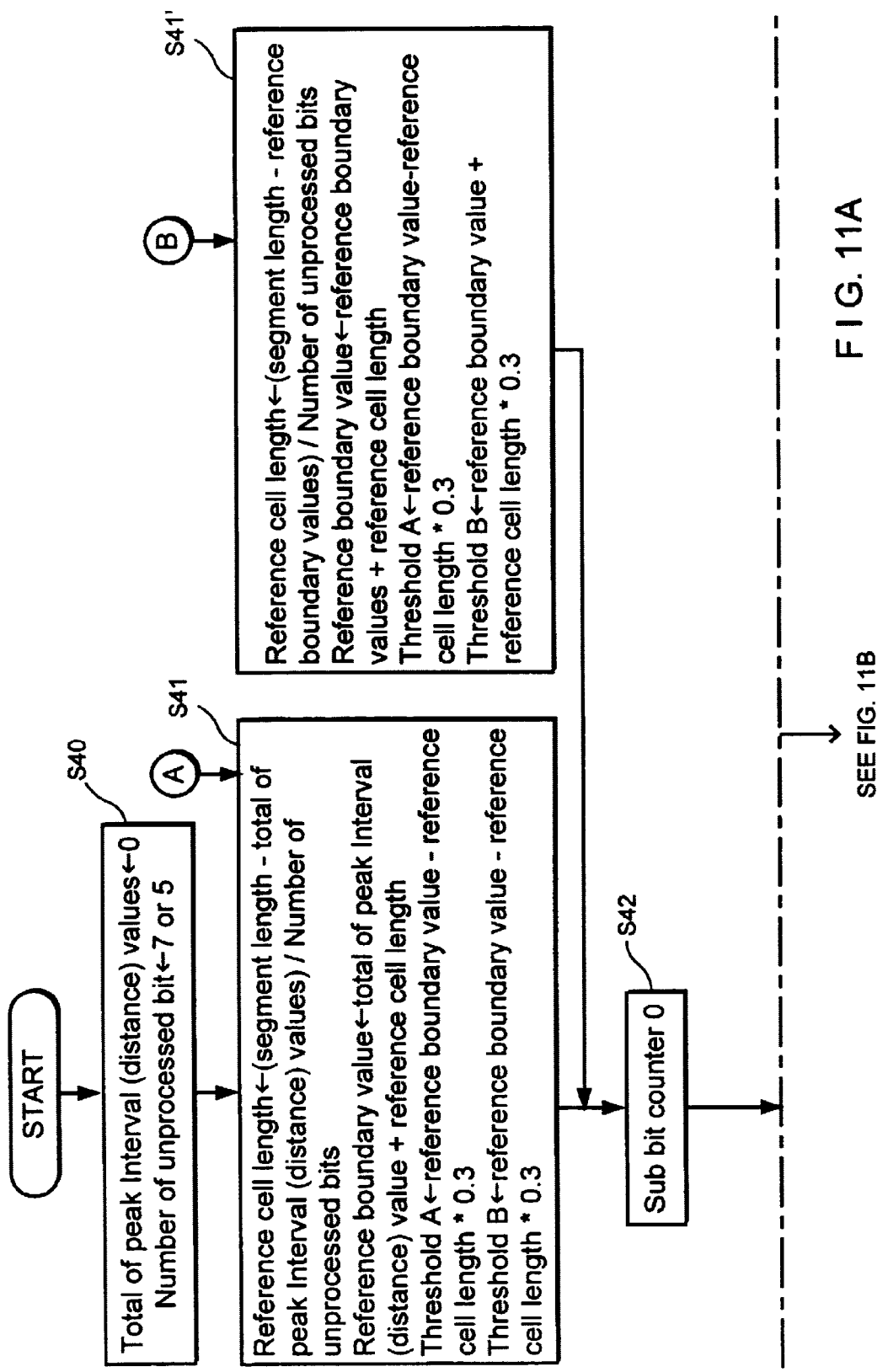
FIG. 11 is a flowchart of an example of a bit conversion that can be applied in the present invention.
Figure 11B:
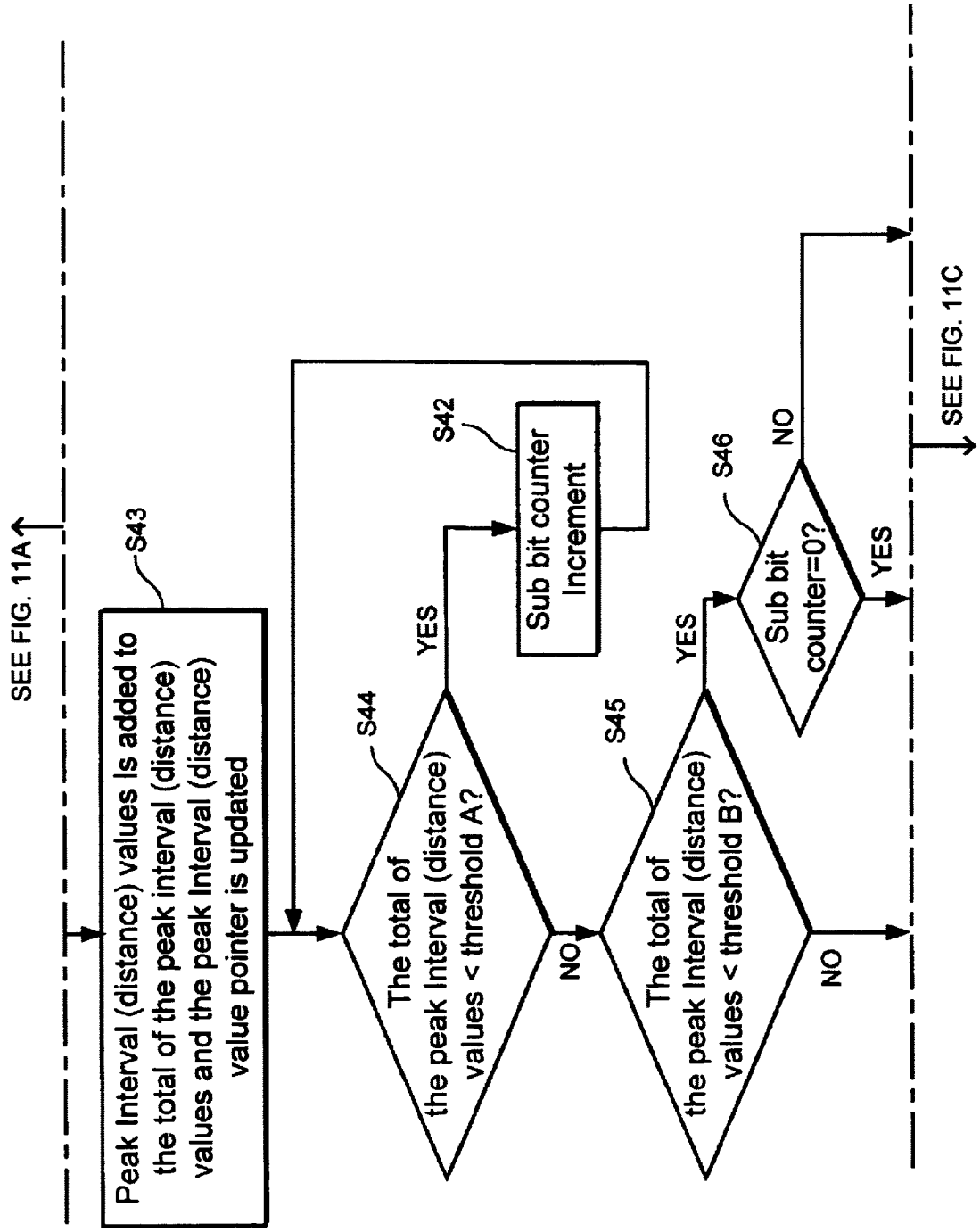
Figure 11C:
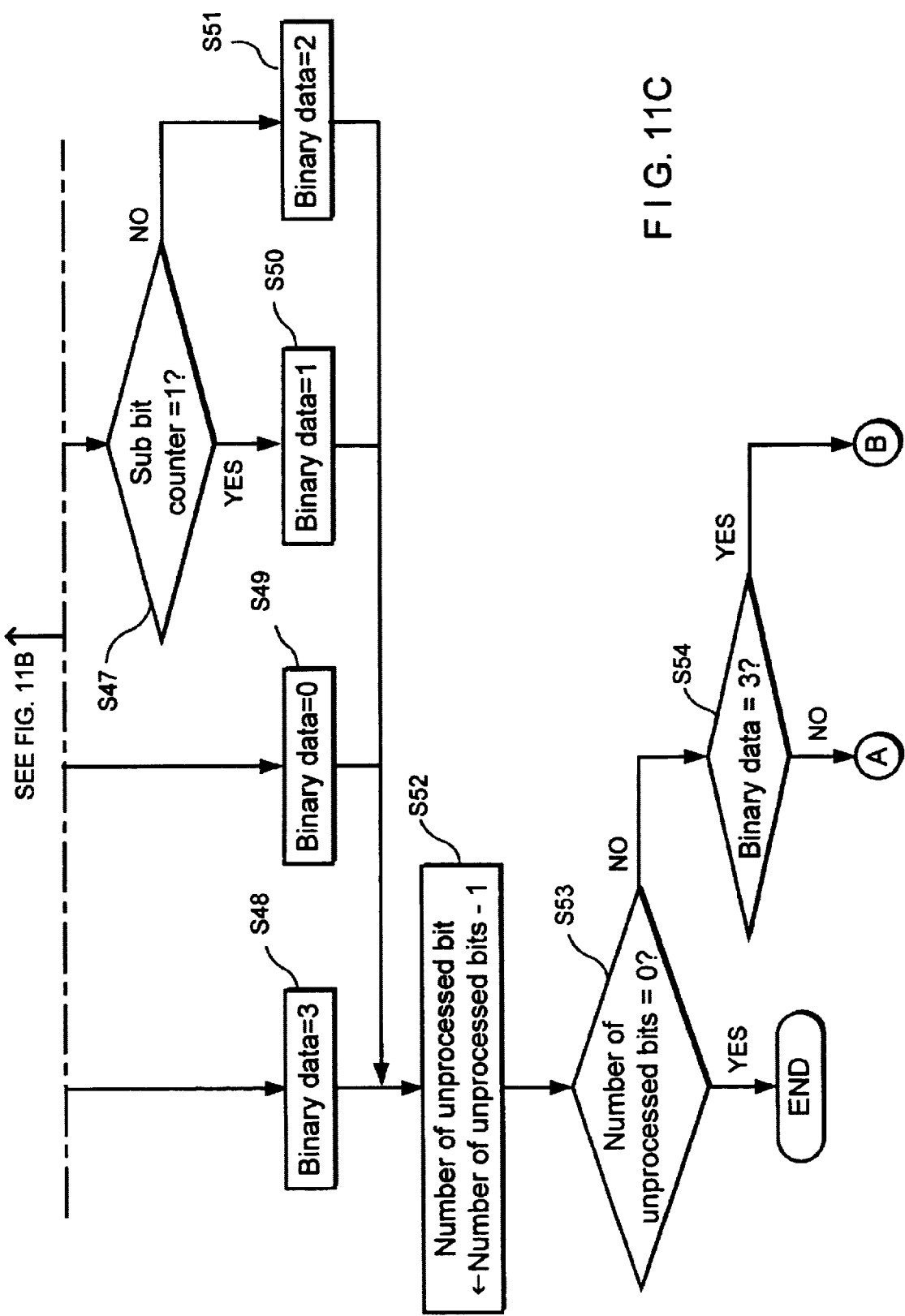

In the example of FIG. 12, the segment length is "322", the peak interval (distance) value total is zero at the beginning, and the initial value for the number of unprocessed bits is "5"; in S41 of FIG. 11, the reference cell length is set to be "64" by calculating 322/5. Since the total of the peak interval (distance) values is zero, the reference boundary value is "64". Consequently the threshold A is (64−64×0.3=44) and the threshold B is (64+64×0.3=83).

In S42 of FIG. 11, a sub bit counter is reset to zero; in S43, the peak interval (distance) value is added to the total of the peak interval (distance) values, and the peak interval (distance) value pointer is updated. In the example of FIG. 12, the first peak interval (distance) value of the segment is "19"; as a result of adding "19" to the total of the peak interval (distance) values, the total is now "19". The peak interval (distance) pointer is updated to "1". The peak interval (distance) value total "19" is compared to the threshold A in S44; since it is smaller than "44" of the threshold A, this indicates that a peak exists in the reference cell length. Therefore, the sub bit counter increases (from 0 to 1 here) in S42', and then the operation returns to S43. In S43, the next peak interval (distance) value "21" is added to the total of the peak interval (distance) values, and the total changes to "40". This value is greater than the threshold A, "44", and smaller than the threshold B, "83"; therefore, the sub bit counter increases (from 1 to 2) in S42' and the operation returns to S43.

The next peak interval value "32" is added to the total of the peak interval values, and the total changes to "72". This value is larger than the threshold A and smaller than the threshold B; therefore, the operation proceeds to S44, S45, and S46 in which it is determined whether the sub bit counter counts "0". The sub bit counter has increased to "2" in S42' as described above, so the operation moves to S51 and "2" is assigned to the first bit. In S52, the number of unprocessed bits changes from "5" to "4". The number of unprocessed bits is not "0" at this point, so the operation returns to S41 through the determination in S53; since the binary value is not "3", the operation returns to S41 via S54.

In S41, the reference cell length, reference boundary value, threshold A, and threshold B are calculated as described above. At this time, the reference cell length is (322−72)/4=62; the reference boundary value is (72+62)=134; the threshold A is (134−62×0.3=116); the threshold B is (134+62×0.3=152). In S43, the peak interval (distance) value, "29", is added to the total to be (72+29=101). In the same manner as above, the operation proceeds as S44 and S42', and returns to S43 in which "35" is added to the peak interval (distance) value total "101", resulting in the total "136". Then, the operation proceeds as S44, S45, S46, S47, and S50 to obtain the second bit as "1". In S52, the number of the unprocessed bits changes from "4" to "3"; the result is not "0" and the binary data is not "3" either, so the operation returns to S41 via S54.

In S41, the reference cell length is calculated as (322−136)/3=62, the reference boundary value as (136+62=198), the threshold A as (198−62×0.3=180), and the threshold B as (198+62×0.3=216); each of the values is set in. Then, the operation proceeds as S43, S44, S42', S43, S44, S45, S46, S47, and S50 to obtain the third bit as "1". The operation is performed until the number of unprocessed bits becomes zero; the fourth bit is given "1" and the fifth bit is given The bit line represented by binary data is obtained through the bit conversion in the above manner. The bit line obtained in the above example is "21110", which is converted into a character code. In this example, the first bit is "2" which is abnormal; if four other bits are regarded as correctly assigned binary data, the number of "0" bits contained in one character should be even and the number of "1" bits be odd because of the characteristic condition of odd parity. The above mentioned normal four bits consist of one "0" bit and three "1" bits; therefore, it is understood that the remaining bit is "0". Hence, the original bit line is "01110" and the character corresponding to this segment can be presumed as "OEH".

In the above manner, a reproduced signal is divided into segments, each of which is equal to the length of one character of recorded data; taking a segment as a process unit, each of peak interval values that are constituents of the segment is compared with a reference value to obtain a bit line composed of "0" and "1" bits, based on which the character code is obtained to correspond to the segment; and using the element of a character time interval for one character, the binary data of each bit is demodulated. Therefore, false readings can be greatly reduced, compared to a conventional method by which a bit line is obtained based on only each bit. Accordingly a highly reliable data demodulating method can be provided. In addition, each of the peak interval values that constitute one character is compared to the reference value to covert [the segment] to a bit line composed of binary data; therefore, it can be detected that the peak interval value is extremely small or large; and by determining (introducing) the bit data corresponding to the abnormal peak interval value, it can be detected that the segment currently under evaluation contains an abnormal waveform. The described segmentation and bit conversion are the same as those described in the above first embodiment and prior Applications filed by the present inventors.

In FIG. 3B again, after the bit conversion, an abnormal peak interval detection is performed in S206; if it is determined in S207 that there is an abnormal peak interval, pattern matching is performed in S208. Here, a reference line pattern composed of peak interval values that constitute one character is pre-stored for each character; the reproduced signal waveform is converted to a digital signal by an AD conversion; time intervals are measured between successive peaks of the digitized reproduced signal; time pattern matching is performed to compare each of the peak interval values that constitute one character with the reference line pattern; and the character corresponding to the reference line pattern having the highest degree of similarity is determined as the character. Time pattern matching is described more specifically hereinafter.

The functional portion of pattern matching is comprised of template, matcher, and data determining means, etc. The functional portion can be operated by CPU or a micro computer as shown in FIG. 1. FIG. 7 shows an example of the template. In the ISO second and third tracks, one character is expressed by five bits consisting of four data bits and one parity bit. Therefore, the template shown in FIG. 7 has sixteen patterns, "T0", "T1", . . . , "T15" for total. FIG. 8 shows the waveform of the pattern "T0", a peak interval value line of the waveform, and the ratio of each peak interval value. This is an ideal waveform for the character code "10H", and the peak interval value line is as T0={64, 64, 64, 64, 32, 32}. "64" can be used for the magnetic inversion distance of the binary data "0" and "34" can be used for that of the binary data "1" as they are; however, if the condition that the ratio of the magnetic inversion distance is 2:1 is satisfied, T0'={2, 2, 2, 2, 1, 1} may be used as shown in FIG. 8. The example of FIG. 7 shows the peak interval value line for each of the character code patterns T0, T1, . . . , T15, by the ratio of magnetic inversion distance and the corresponding character code as well.

A specific example of pattern matching using the above template is described referring to FIG. 4, FIG. 5, FIG. 9, and FIG. 10. Note that the waveforms illustrated in FIG. 4 and FIG. 5 are the same: FIG. 4 shows correct bit conversion and false bit conversion of the waveform; FIG. 5 shows a peak interval value line obtained by measuring the waveform. First, peak interval values P of a target pattern are obtained in S1 in FIG. 10. In the example of FIG. 5, the line of the peak interval values P is {65, 44, 34, 31, 31, 25, 38, 58}. Thus, P consists of eight components; from the templates of sixteen patterns shown in FIG. 7, ten templates {TP3, TP5, TP6, TP7, TP9, TP10, TP11, TP12, TP13, and TP14} of which respectively consists of eight components, are obtained as the templates for comparison, as shown in FIG. 9 (S3).

Next, correlation values are calculated between the target pattern and the selected ten templates. The calculation of the correlation value is obtained by the following equation. rk is a correlation value; Sn is a segment; Tk is a template. where k=0~15

$Sn=(Sn_1 \ldots Sn_n)$ $Tk=(Tk_1 \ldots Tk_n)$ $$rk = \frac{\sum (Sn_1 - Sn_m)(Tk_1 - Tk_m)}{\sqrt{\sum (Sn_1 - Sn_m)^2} \sqrt{\sum (Tk_1 - Tk_m)^2}} \quad (k = 0 \ldots 15)$$

$Sn_m$ and $Tk_m$ respectively represent the averages of $Sn_1$ and $Tk_1$ $-1.0 \leq rk - 1.0$ After calculating the correlation values for all the ten templates (S5), the greatest correlation value is found among the obtained correlation values (S7). FIG. 9 shows each of the correlation values obtained by calculation of comparing the waveform illustrated in FIG. 4 and FIG. 5 with the selected ten templates. According to this example, the correlation value with the template TP14 is approximately 0.9, which is the greatest; therefore, it is determined that the character represented by this segment is "OEH" (code "01110B") corresponding to the template TP14. This character code agrees with the original bit converted value line of the waveform illustrated in FIG. 4; it is understood that, even if the waveform contains a peak shift (jitter) as shown in FIG. 4, the signal waveform can be read correctly.

As described in S211 of FIG. 3, peak detection, peak interval measurement, segmentation, and peak interval matching (pattern matching) operations are repeated until the LRC is demodulated. After the LRC is demodulated, it is checked in S212 as a final step. In other words, the result of the entire demodulation is determined.

According to the above described segmentation and peak interval matching (pattern matching), a reference line pattern composed of peak interval values that constitute one character is pre-stored for each character; time intervals of the reproduced signal are measured; each of the peak interval values that constitute one character is compared with the reference line patterns to provide similarities; and the character corresponding to the reference line pattern showing the highest degree of similarity is determined as the character expressed by the segment. Therefore, even if the signal waveform contains an abnormal portion, such as a local change of peak interval, which cannot be correctly determined by the bit conversion, a whole block as a segment that constitute one character is hardly affected by the local change in the peak interval. Thus, the character can be correctly determined, increasing reliability of data demodulation.

Even with this, however, if the signal appears at unexpected positions due to contamination, scratches, or wear on a surface of a recording medium, the character determined in the above manner, which should be correct, may possibly be a wrong character. In the present invention, the aforementioned segmentation is modified to further reduce errors in data demodulation. An example of segmentation that is a feature of the present invention will be specifically described.

Figure 13:
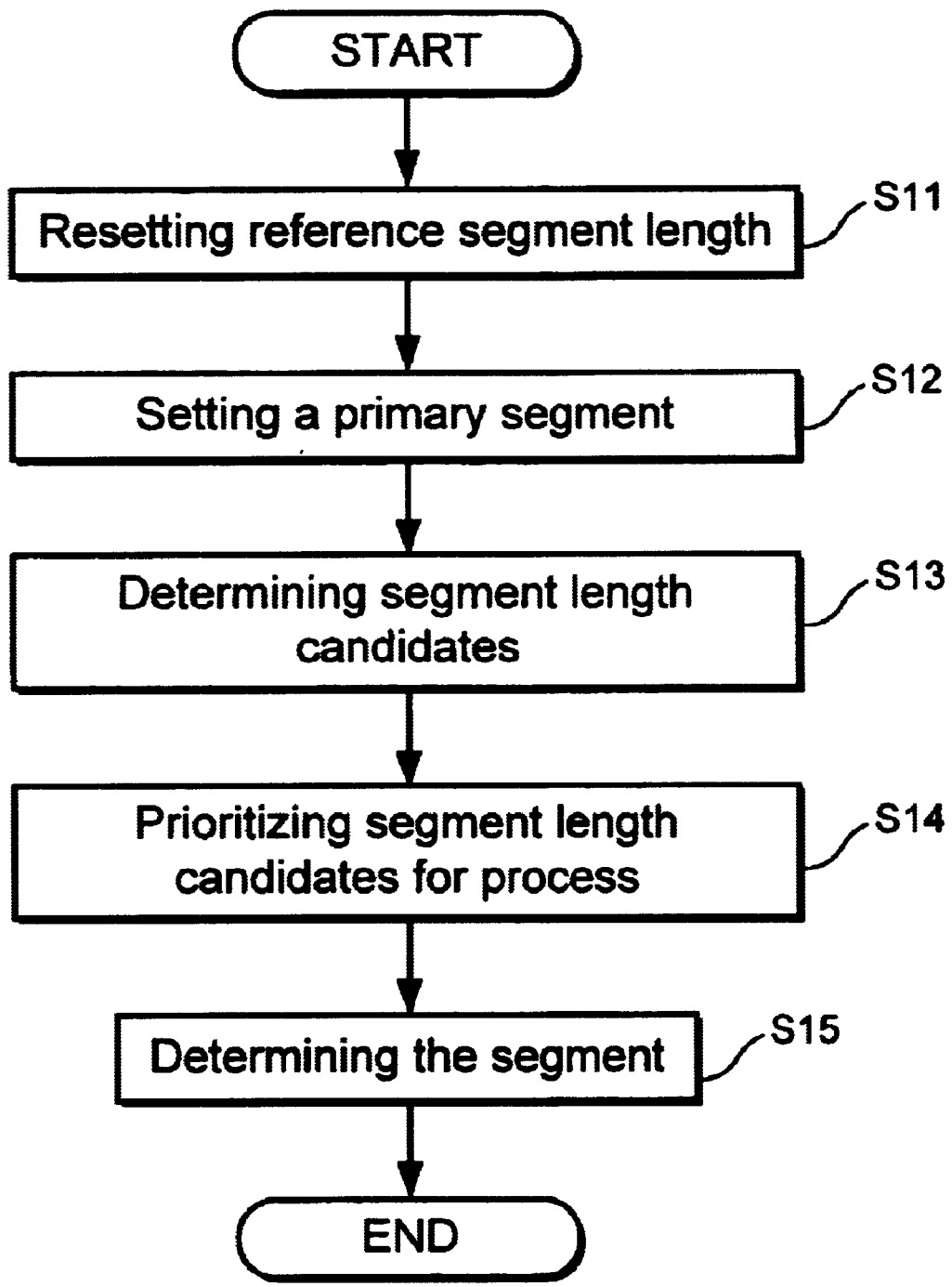
FIG. 13 is a flowchart of a basic operation of the segmentation that can be applied in the present invention.

FIG. 13 shows a flow of basic steps of segmentation. In FIG. 13, a reference segment length is reset in S11; a segment having the closest length to the reference segment length is set as a primary segment in S12. Selected in S13 are a segment having the length shorter than the primary segment by two peak interval values and a segment having the length longer than the primary segment by two peak interval values; thus, three kinds of segments are prepared as segment length candidates. Furthermore, the three kinds of segments are prioritized in S14 to decide the order for pattern matching. Following in this order, pattern matching is performed on the three kinds of the segments. Based on the results, the segment is determined to correspond to the waveform portion in S15. This segmentation is described in detail using the example of the waveform.

Figure 14:
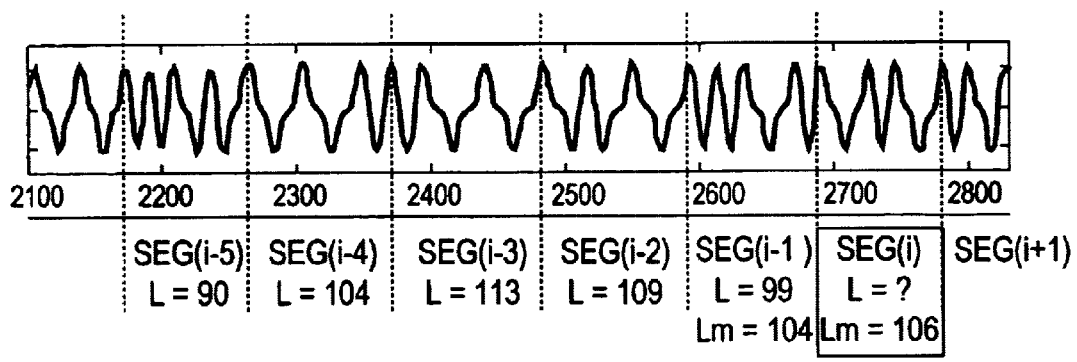
FIG. 14 is a waveform diagram showing a portion of a reproduced signal waveform to explain the above segmentation.

FIG. 14 illustrates a portion of a reproduced signal waveform to explain the above segmentation. The waveform is obtained when the ISO third track of a magnetic card is read. In this format, one character consists of four data bits and one parity bit; the parity is an odd parity. Now, the target portion for segmentation is "SEG(i)" in FIG. 14. The reference segment length used for segmentation is the average of the segment lengths of preceding, successive four segments, "SEG(i−4)", SEG(i−3)", "SEG(i−2)", and SEG (i−1)". With this, variations in the reference segment length can be prevented. In the example of FIG. 14, the reference segment length "Lm" obtained in the above manner is "106".

Figure 15:
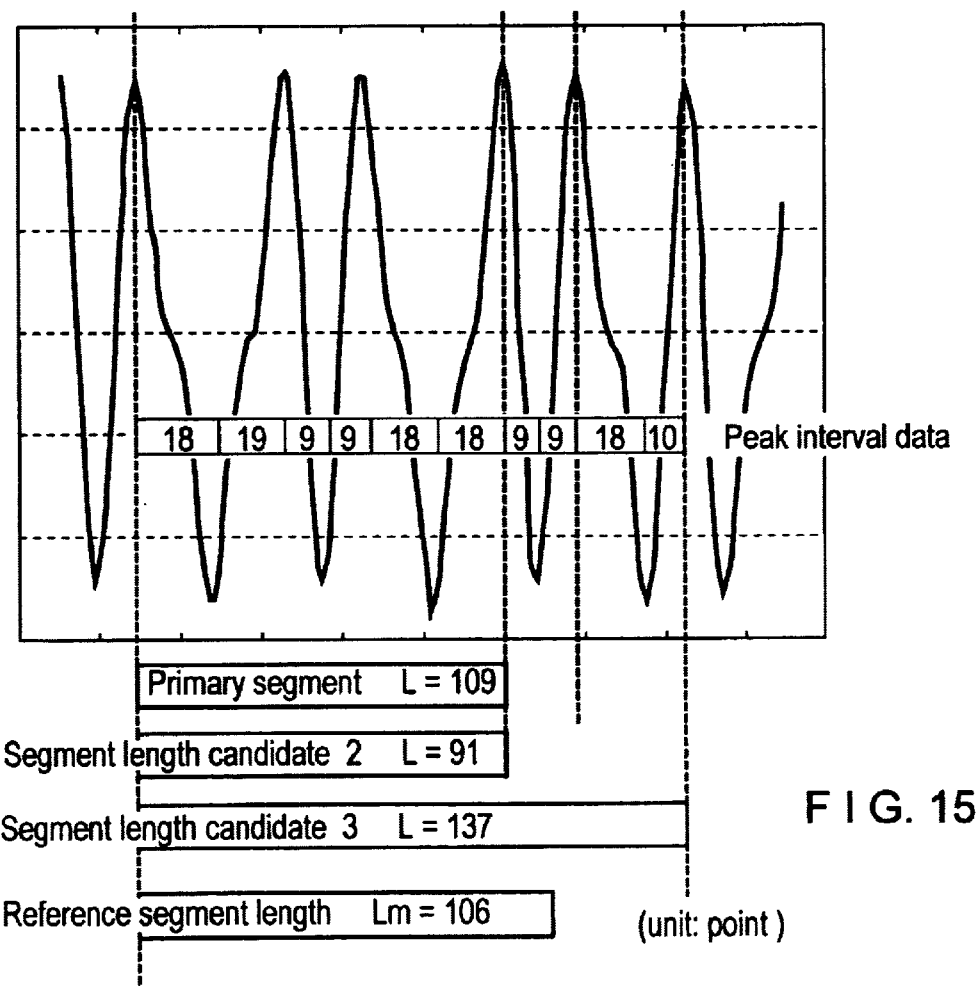
FIG. 15 is a waveform diagram showing how a plurality of segment length candidates including a primary segment are determined in the segmentation.

Next, a primary segment is set. This is carried out by the same segmentation as the invention of the above first embodiment. FIG. 15 shows how to set the three kinds of segments including the primary segment. In the example of FIG. 15, a threshold level used for setting the primary segment is 106×0.9=95. The total value of the first seven peak interval data makes "100", which exceeds the threshold level "95". However, since the number of the peak interval data to be added should be even, the calculation ceases after adding the eighth peak interval value "9" in this example. Accordingly, the primary segment is one represented by L=109 in FIG. 15.

Two more segments are selected and set as segment length candidates based on the primary segment: a segment represented by L=91 in FIG. 15, which has the length shorter than the primary segment by two peak interval values, i.e., which is segmented at an adjacent peak position of the same polarity as the segmenting position of the primary segment; a segment represented by L=137 in FIG. 15, which has the length longer than the primary segment by two peak intervals, i.e., which is segmented at another adjacent peak position of the same polarity as the segmenting position of the primary segment. The reason for selecting the segments having lengths shorter and longer than the primary segment by two peak interval values is a restraint that the number of the peak interval data that constitute a segment should be even. In other words, unless the (counterfeit) card is made deliberately, there is no segment having seven or nine peak interval data.

After the segment length candidates are set in the above manner, the priority of the candidates for process is determined. Among the above selected three kinds of segments, the segment having the length closest to the reference segment length is selected and prioritized as the first candidate for process. The segment having the length the second closest is prioritized as the second, and the remaining segment is the third. This determination is obtained by simply calculating the difference between the segment lengths and prioritizing the segment length candidates according to the results. Finally, evaluation/determination is performed on the segments.

FIG. 16 is a flowchart of the above operation. In FIG. 16, a first segment length candidate is set in S21; a time pattern matching computation is performed on the first segment length candidate in S22 to obtain a correlation value "r". The matching computation is performed by the same method as that described in specification and drawing of the above first embodiment. The correlation value "r" is compared to a pre-stored standard value "r0" in S23; when "r" is more than "r0", this segment length candidate is adopted as a correct segment in S27. When "r" is less than the standard value "r0", it is checked in S24 if unprocessed segment length candidates remain; when unprocessed segment length candidate remain, the time pattern matching computation is performed on the lower prioritized segment in S26; when there is no unprocessed segment, it is determined that the cause for the correlation value not satisfying the standard value is not a false segmentation but an abnormal waveform, and the first segment is adopted as a correct segment in S25.

According to the above described embodiment of the present invention, peak time intervals are measured between successive peaks of the reproduced signal waveform; each of the peak interval values that constitute one character is compared with the reference value to convert the signal waveform into a bit line composed of binary data; for demodulation of data that correspond to one character, a plurality of segment length candidates for demodulation are selected on the basis of a reference segment length corresponding to the data interval for one character and the peak positions, pattern matching is performed between a plurality of the segment length candidates and the reference waveform data to provide similarities, and the character is determined based on the similarity. Therefore, even when the peak intervals of the reproduced waveform are significantly disordered because of variations of card transporting speed, etc., the card data can be correctly read, thus making it possible to provide highly reliable data demodulating method and apparatus with less false readings. Also, abnormal peaks and missing peaks in the reproduced waveform can be detected.

The data demodulating method and apparatus of the present invention can be incorporated in motor-driven magnetic card readers as well as manual magnetic card readers.

EFFECTS OF THE INVENTION

According to this invention, peak time intervals are measured between successive peaks of the reproduced signal waveform; each of the peak interval values that constitute one character is compared with the reference value to convert the signal waveform into a bit line composed of binary data; for demodulation of data that correspond to one character, a plurality of segment length candidates for demodulation are selected on the basis of a reference segment length equal to the data interval for one character and peak positions, pattern matching is performed between a plurality of the segment length candidates and the reference waveform data [to provide similarities], and the character is determined based on the similarity. Therefore, even when the peak intervals of the reproduced waveform becomes significantly irregular because of variations of card transporting speed, etc., the card data can be correctly read, thus making it possible to provide highly reliable data demodulating method and apparatus with less false readings.

According to this invention, the pattern matching is a time pattern matching, and the segment length candidates are prioritized according to the closeness to the reference segment length; therefore, the segment length candidates are reasonably selected.

According to this invention, the reference segment length is determined by the average of a plurality of segment lengths successively preceding the target segment.

According to this invention, the reference segment length is reset for each segment, and the segment length candidates are selected such that the peak positions thereof for segmentation are of the same polarity [as the reference segment] so that it is determined if the evaluation value of the pattern matching satisfies the reference value; thus, the segmentation can be performed reasonably and accurately, making it possible to provide a more reliable data demodulating method with less false readings.

According to this invention, when the evaluation value of the pattern matching does not satisfy the reference value, the segment length candidate closest to the reference segment length is selected; thus, the segmentation can be performed reasonably and strictly, making it possible to provide a more reliable data demodulating method with less false readings.

What is claimed is:

1. A data demodulating method in which binary data are defined by two-frequency encoded signal composed of a combination of high and low frequency signals, binary data for one character are defined by a predetermined number of said binary data and a parity bit, peak points are detected in a reproduced signal waveform obtained by reproducing a recorded data signal to demodulate said binary data, comprising the steps of:

preparing in advance a reference line pattern for each character, composed of peak interval values of bits that constitute one character;

measuring time intervals between successive peaks of said reproduced signal; and comparing each of said peak interval values that constitute one character with said reference line patterns by a pattern matching to determine the character corresponding to said reference line pattern having the highest degree of similarity as the character.

2. The data demodulating method as set forth in claim 1 wherein reference line patterns for comparison are selected from said reference line patterns according to the number of peak intervals that constitute one character.

3. The data demodulating method as set forth in claim 1, further comprising steps of:

converting said reproduced signal waveform to a digital signal by an AD conversion;

measuring time intervals between successive peaks of said digitized reproduced signal to create a peak interval value line;

determining the end of one character by successively adding each of peak interval values of said peak interval value line; and comparing each of said peak interval values that constitute one character with said reference line patterns.

4. The data demodulating method as set forth in claim 3, further comprising steps of:

predetermining a character time interval for one character of said recorded data by a predetermined number of bits in a given range;

determining said end of one character based on a peak position within said character time interval for one character;

detecting if the number of peak interval values up to said peak position within said character time interval satisfies the characteristic condition of parity bit;

when said condition is not satisfied, adding the next peak interval value to determine the end of one character.

5. The data demodulating method as set forth in claim 1 wherein time intervals of said reference line patterns are expressed by binary numbers based on the length of said time intervals, and a pattern matching is performed to compare said peak interval values of said reproduced signal with said reference line patterns expressed by binary numbers.

6. A data demodulating method in which binary data are defined by a two-frequency encoded signal composed of a combination of high and low frequencies, data for one character are produced with a predetermined number of said binary data and a parity bit, and peak points of a reproduced signal waveform obtained by reproducing a recorded data are detected to read said binary data, comprising steps of:

measuring peak time intervals between successive peaks of said reproduced signal waveform;

comparing each of said peak interval values that constitute one character with a reference value to convert said signal waveform to a bit line composed of said binary data;

for demodulating data of one character, selecting a plurality of segment length candidates for demodulation, on the basis of a reference segment length equal to a data interval for one character and peak positions; and performing pattern matching on a plurality of said segment length candidates with reference waveform data to determine the character according to the similarity.

7. The data demodulating method as set forth in claim 6 wherein said pattern matching is a time pattern matching, and said segment length candidates are prioritized according to the closeness to said reference segment length.

8. The data demodulating method as set forth in claim 6 wherein said reference segment length is determined by the average of a plurality of segment lengths successively preceding the target segment.

9. The data demodulating method as set forth in claim 8 wherein said reference segment length is reset for each segment, said segment length candidates are selected such that the peak positions of the same polarity as that of said reference segment are used for segmenting, and it is determined if the evaluation result of said pattern matching satisfies the reference value.

10. The data demodulating method as set forth in claim 9 wherein, when said evaluation result of said pattern matching does not satisfy the reference value, the segment length candidate having the length closest to said reference segment length is selected.

11. A data demodulating apparatus in which binary data are defined by a two-frequency encoded signal composed of a combination of high and low frequencies, data for one character are produced with a predetermined number of said binary data, and peak points of a reproduced signal waveform obtained by reproducing a recorded data are detected to read said binary data, comprising:

a means of measuring peak time intervals between successive peaks of said reproduced signal waveform;

a means of demodulating data for one character by comparing each of said peak interval values that constitute one character with a reference value to convert said signal waveform to a bit line composed of said binary data; and for demodulating data of one character, a means of determining the character, wherein a plurality of segment length candidates for demodulation are selected on the basis of a reference segment length equal to a data interval for one character and peak positions; pattern matching is performed on a plurality of said segment length candidates with reference waveform data to determine the character according to the similarity.

* * * * *